(12) United States Patent
Song et al.

(10) Patent No.: US 9,014,760 B2
(45) Date of Patent: Apr. 21, 2015

(54) MOBILE TERMINAL AND METHOD OF CONTROLLING THE SAME

(75) Inventors: Yoomee Song, Seoul (KR); Yeerang Yun, Seoul (KR); Choonjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 13/366,616

(22) Filed: Feb. 6, 2012

(65) Prior Publication Data

US 2013/0040562 A1    Feb. 14, 2013

(30) Foreign Application Priority Data

Aug. 10, 2011    (KR) .................. 10-2011-0079396

(51) Int. Cl.
| | |
|---|---|
| H04M 1/00 | (2006.01) |
| H04B 1/38 | (2006.01) |
| H04M 1/725 | (2006.01) |
| G06F 1/16 | (2006.01) |
| G06F 3/01 | (2006.01) |
| G06F 3/0488 | (2013.01) |

(52) U.S. Cl.
CPC ........ *H04M 1/7253* (2013.01); *H04M 2250/02* (2013.01); *H04M 2250/04* (2013.01); *H04M 2250/06* (2013.01); *H04M 2250/12* (2013.01); *H04M 2250/22* (2013.01); *H04M 2250/64* (2013.01); *G06F 1/1643* (2013.01); *G06F 1/1694* (2013.01); *G06F 1/1698* (2013.01); *G06F 3/017* (2013.01); *G06F 3/04883* (2013.01)

(58) Field of Classification Search
CPC .................... G06F 3/1454; H04L 67/1095
USPC ........................................... 455/566
See application file for complete search history.

(56) References Cited

U.S. PATENT DOCUMENTS

| | | | |
|---|---|---|---|
| 7,561,899 B2 * | 7/2009 | Lee .............................. | 455/566 |
| 7,756,549 B2 * | 7/2010 | Baek et al. ................... | 455/566 |
| 2008/0195735 A1 | 8/2008 | Hodges et al. | |
| 2011/0081923 A1 | 4/2011 | Forutanpour et al. | |

FOREIGN PATENT DOCUMENTS

| | | |
|---|---|---|
| WO | WO 2004/075169 | 9/2004 |
| WO | WO 2011/124746 | 10/2011 |

OTHER PUBLICATIONS

European Search Report dated Jan. 9, 2013 for Application 12157392.7.
Nitesh Goyal; "COMET: Collaboration in Applications for Mobile Environments by Twisting;" INTERACT 2009, Aug. 24, 2009; pp. 1-6.

* cited by examiner

*Primary Examiner* — Eugene Yun
(74) *Attorney, Agent, or Firm* — KED & Associates, LLP

(57) ABSTRACT

A mobile terminal and a method of controlling a mobile terminal may be provided. The mobile terminal may include a sensing unit, a wireless communication unit for exchanging data with at least one other terminal, and a controller for acquiring data from the at least one other terminal or transmitting data to the at least one other terminal through the wireless communication unit according to a transmission direction of determined data based on a result acquired through the sensing unit.

21 Claims, 44 Drawing Sheets

FIG. 10
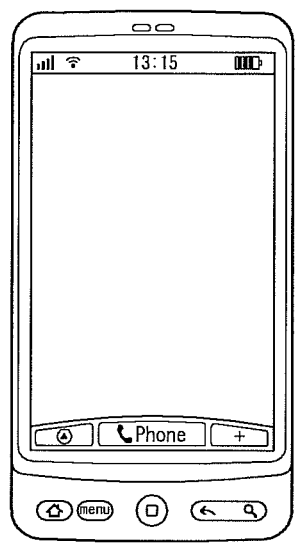
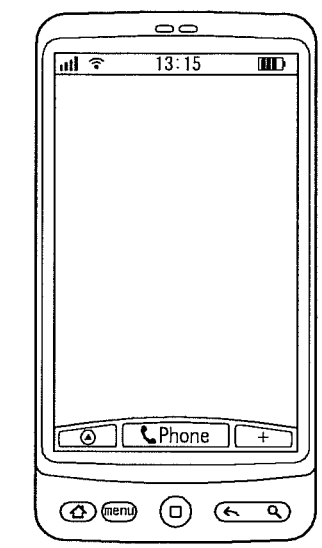
(a)
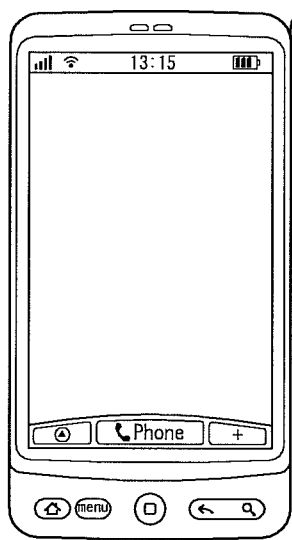
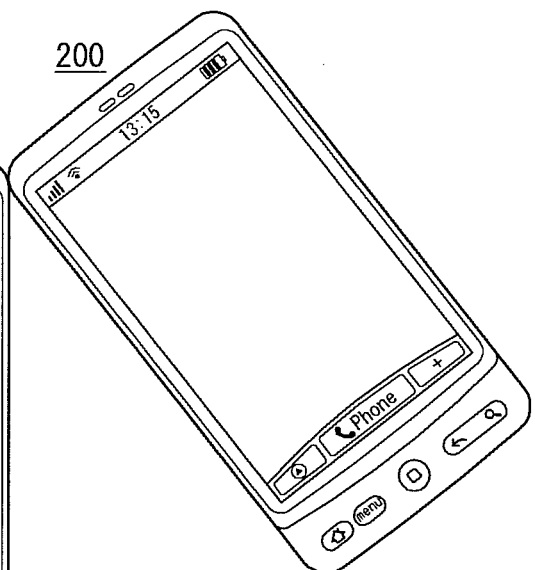
(b)

FIG. 12
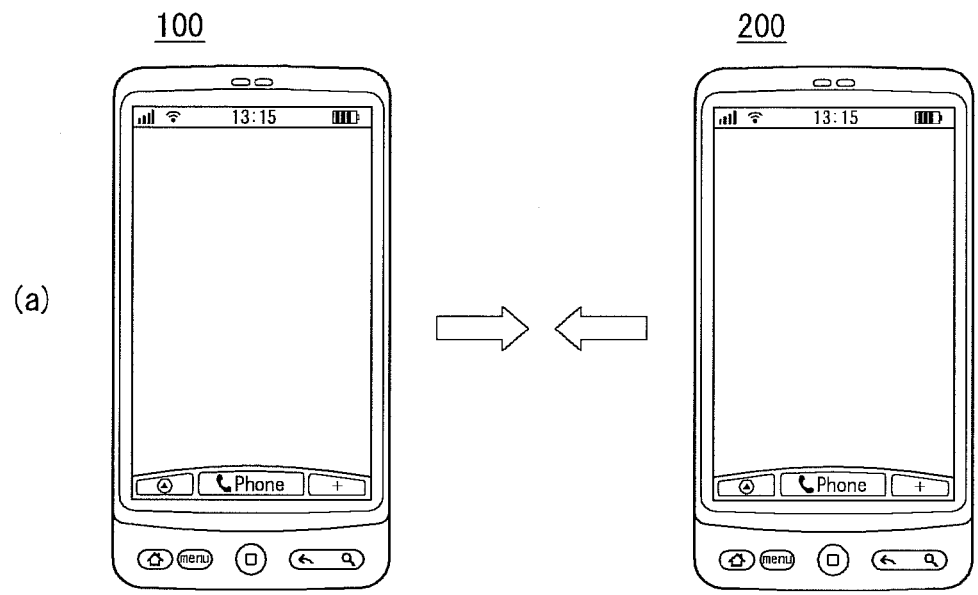
(a)
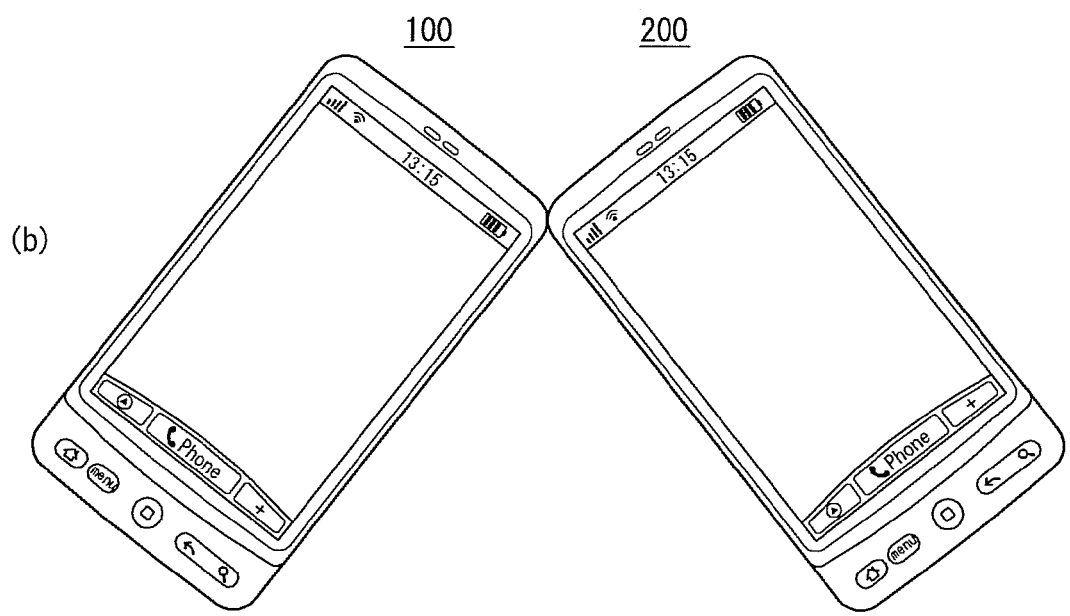
(b)

FIG. 15
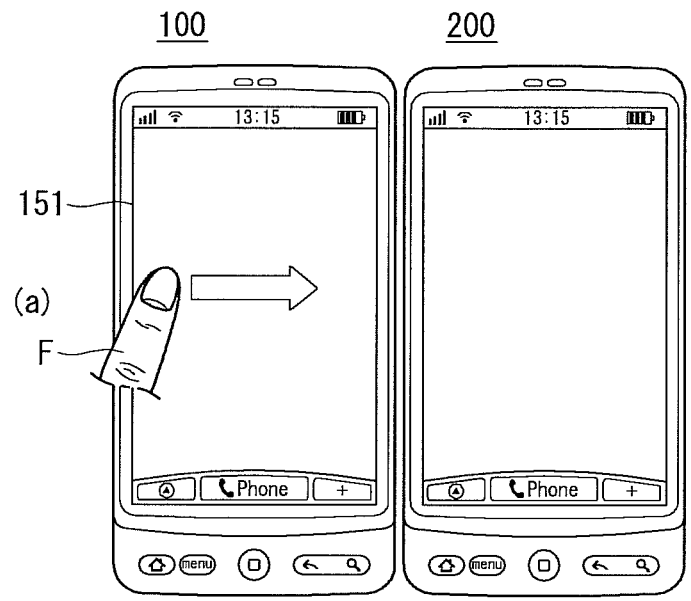
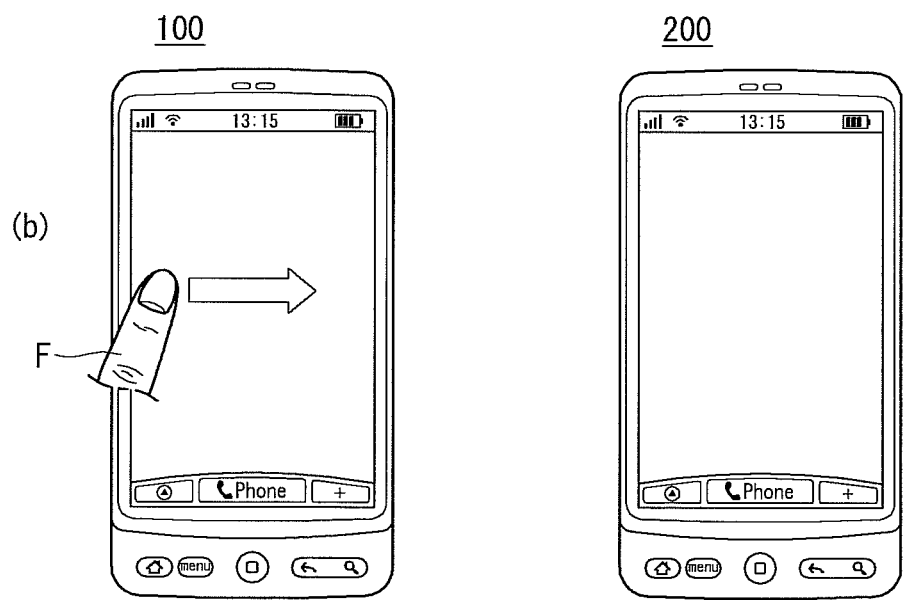

FIG. 16
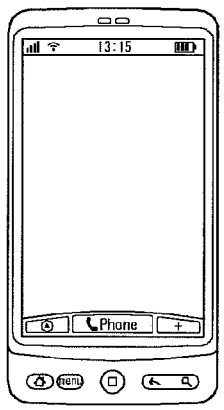
201
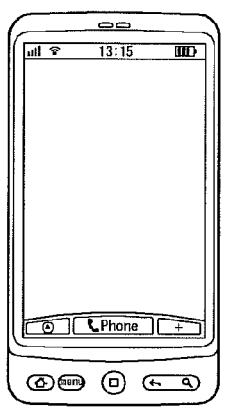
202
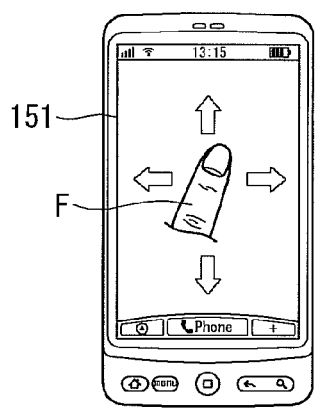
100
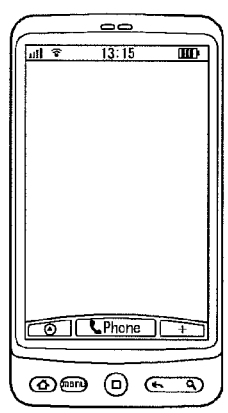
204
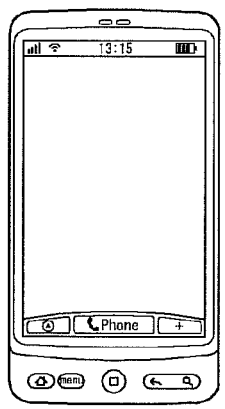
203

FIG. 18
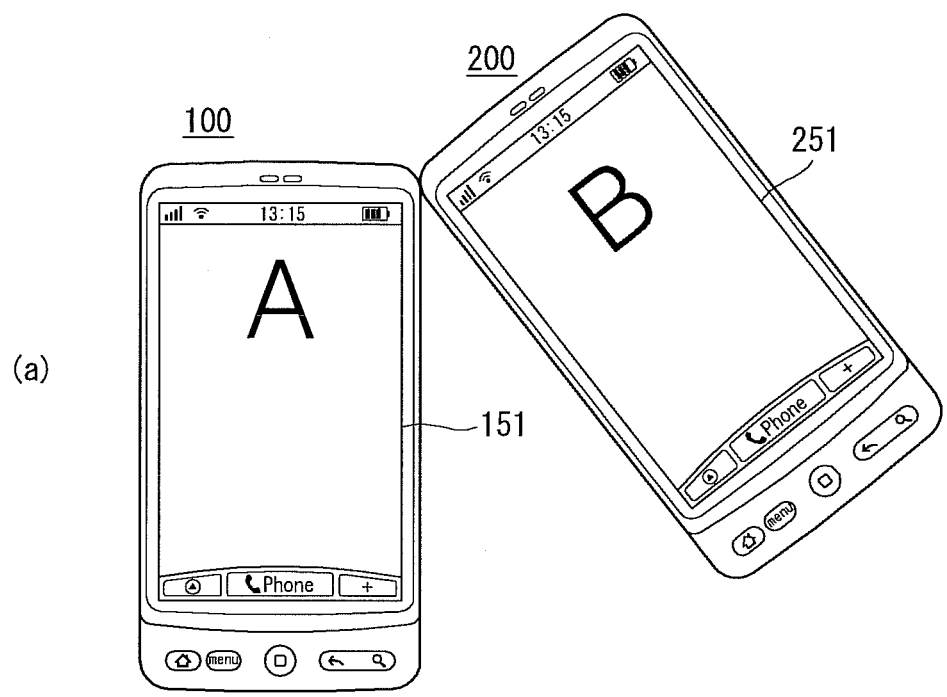
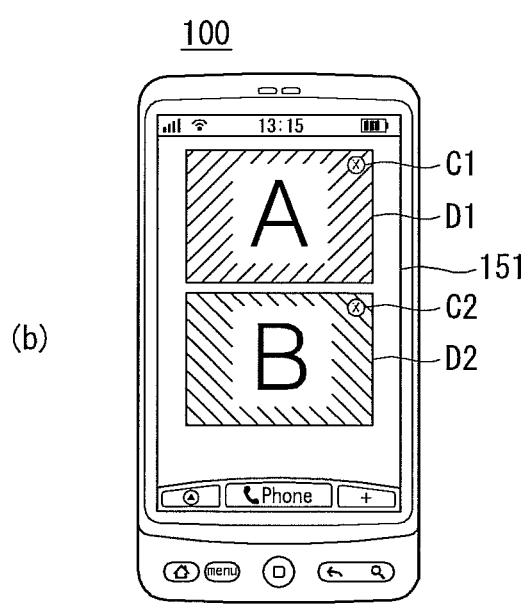

FIG. 19
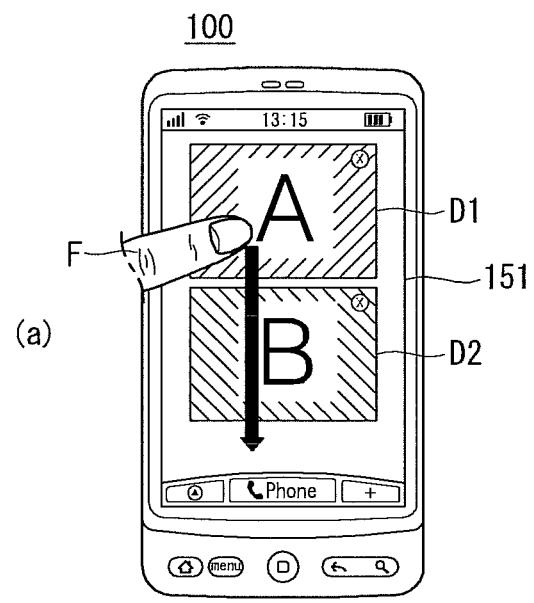
(a)
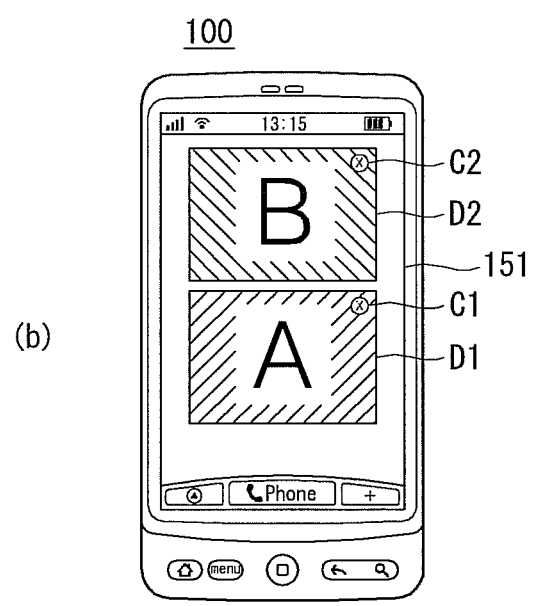
(b)

FIG. 20
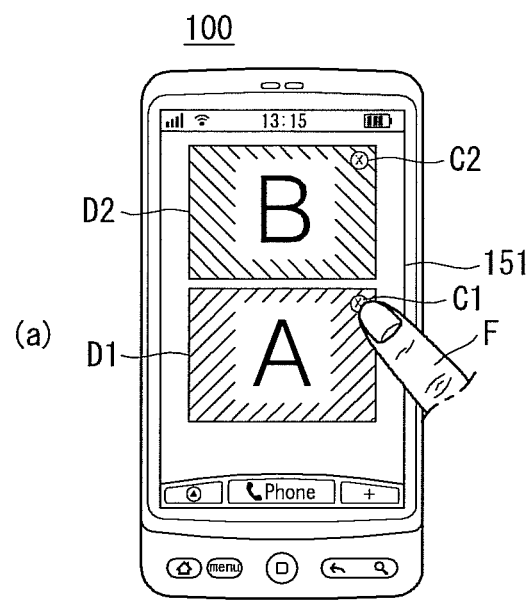
(a)
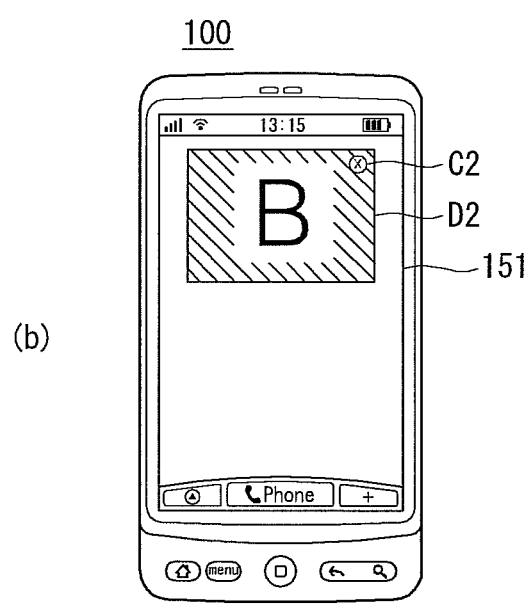
(b)

FIG. 21
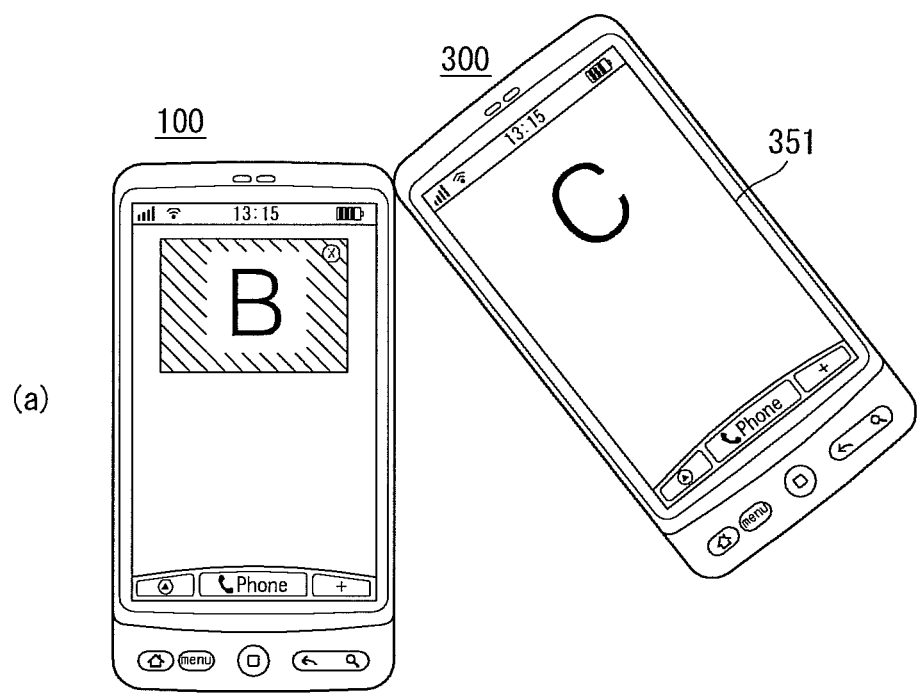
(a)
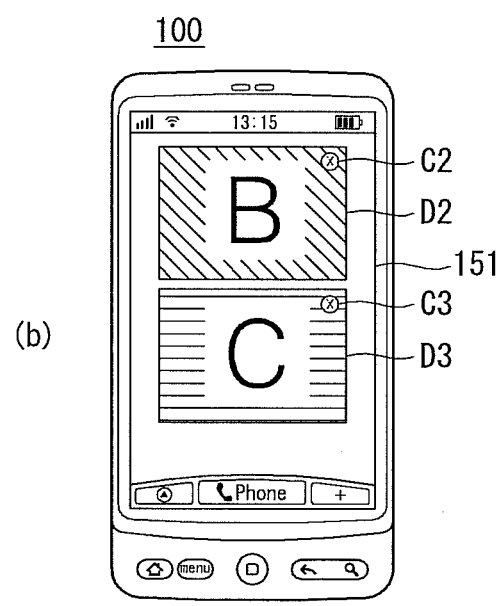
(b)

FIG. 22
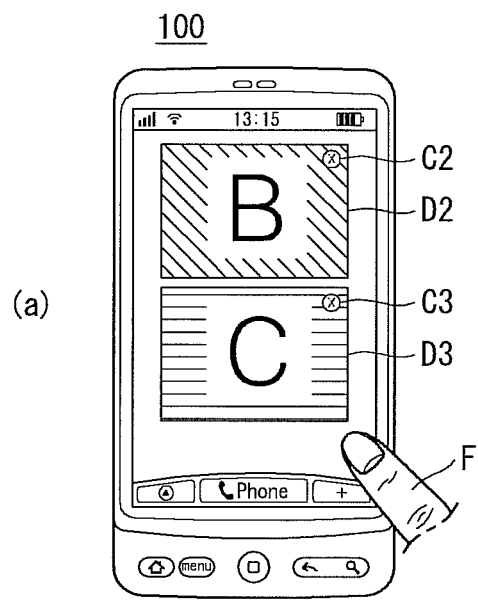
(a)
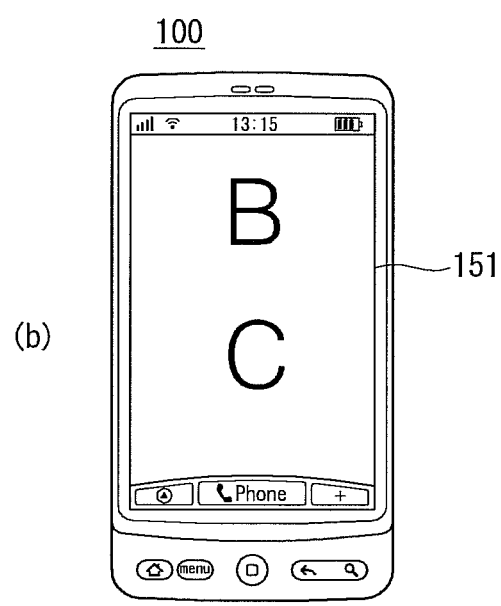
(b)

FIG. 23
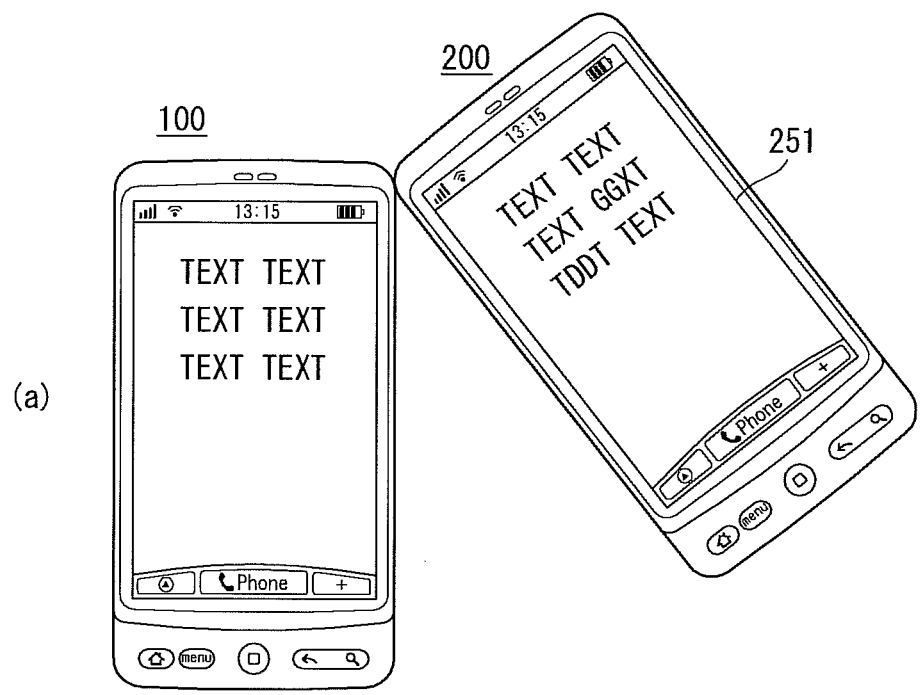
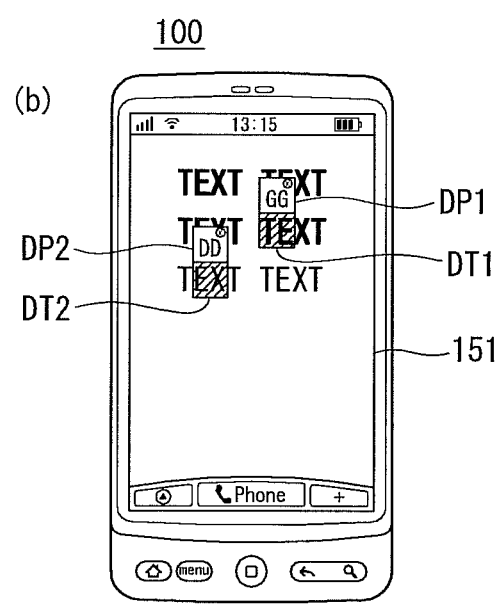

FIG. 24
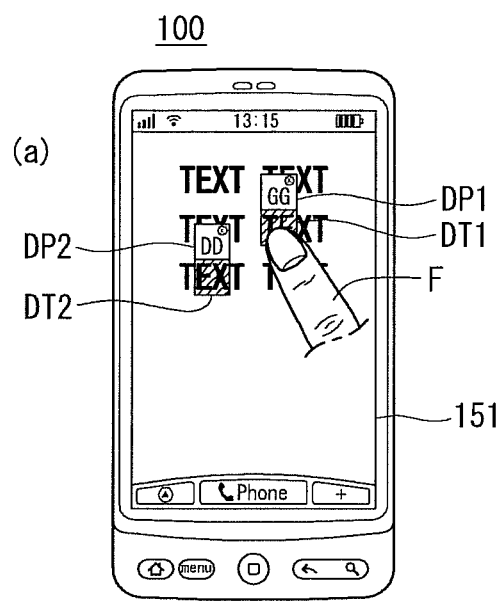
(a)
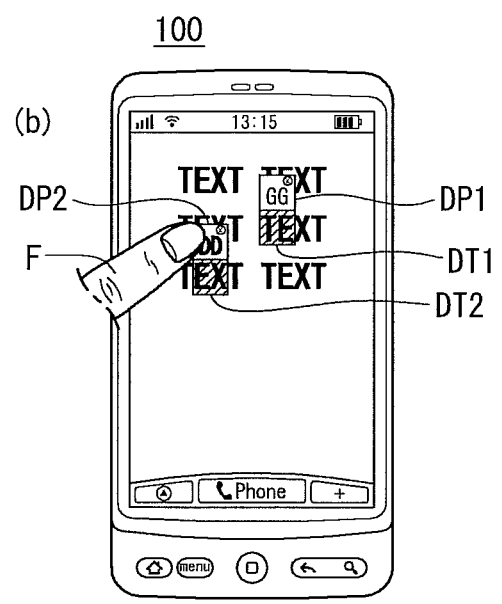
(b)

FIG. 33
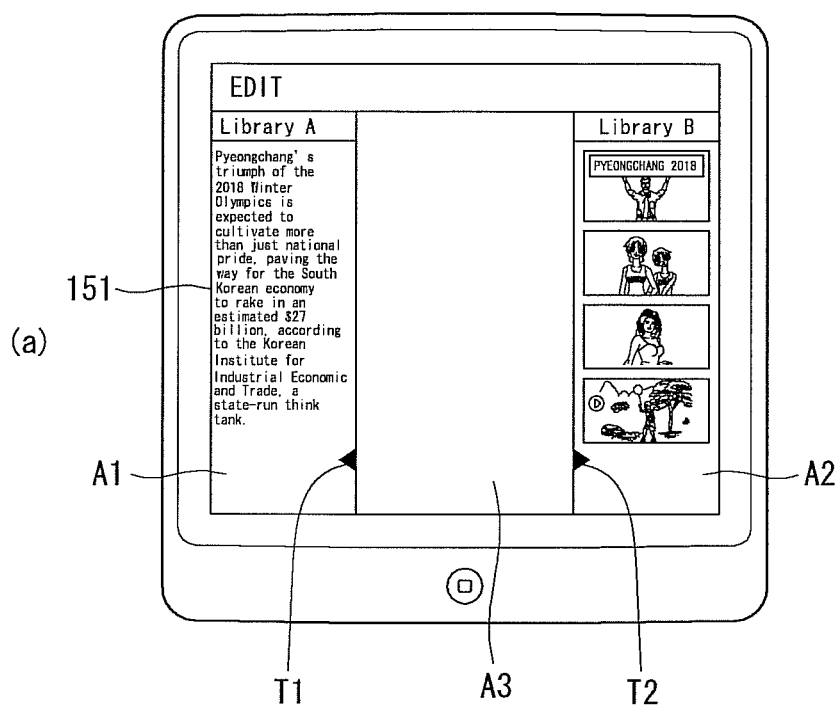
(a)
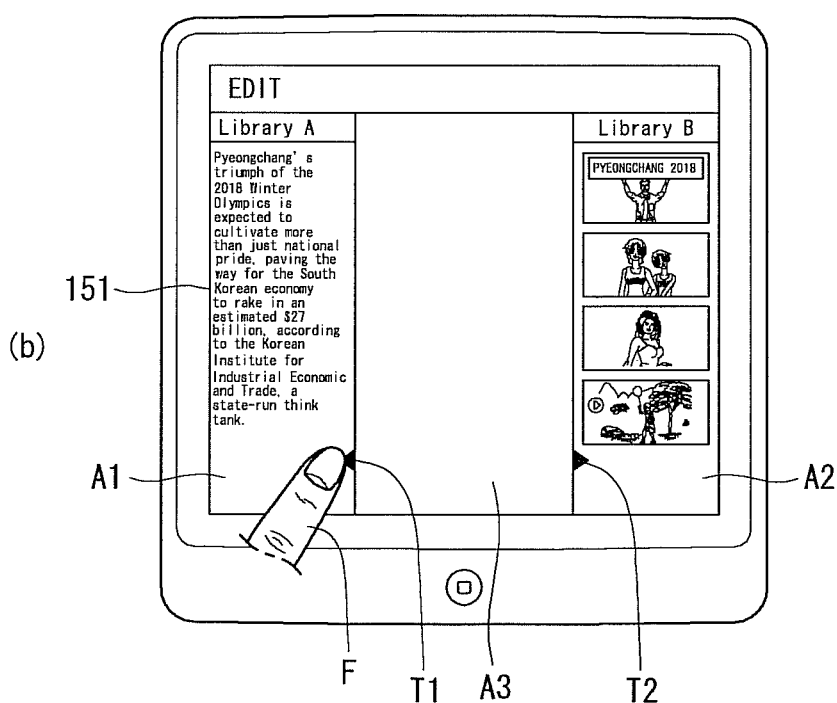
(b)

FIG. 37
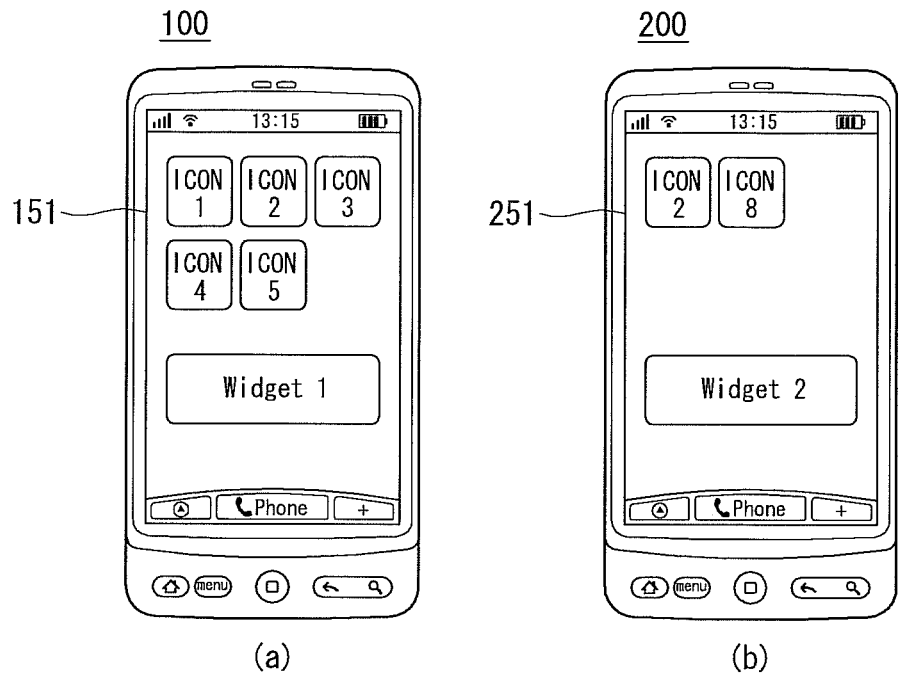
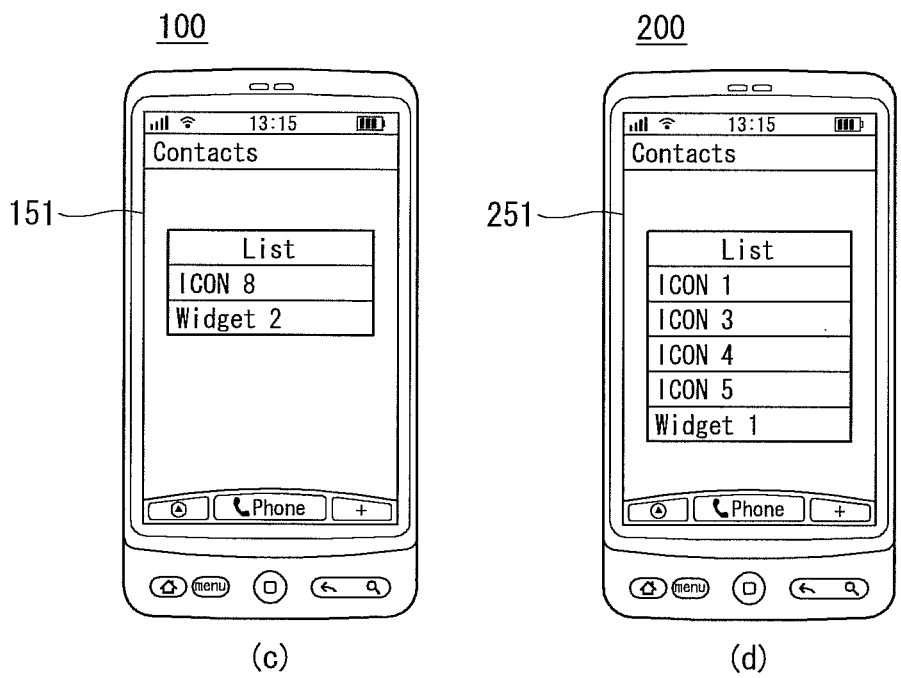

FIG. 38
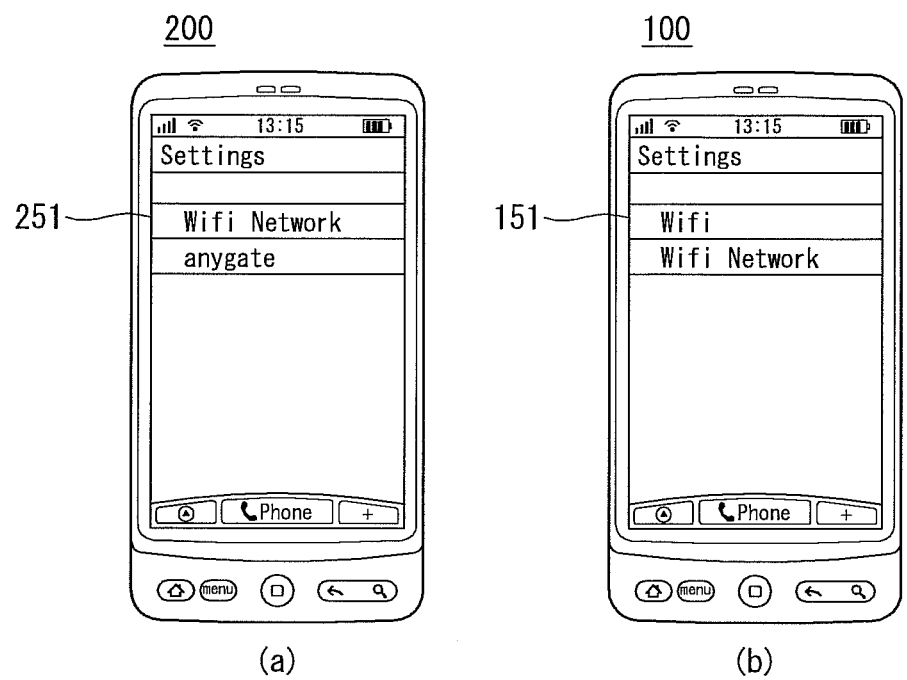
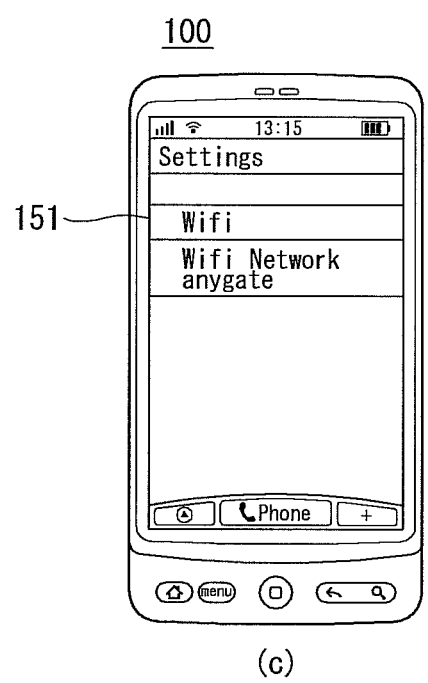

FIG. 39
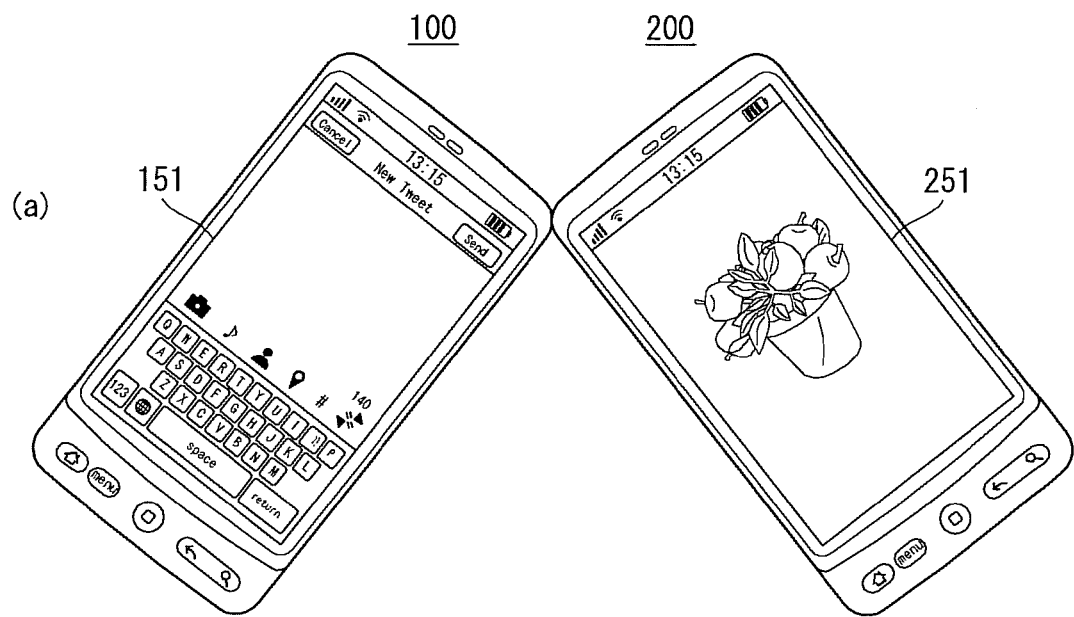
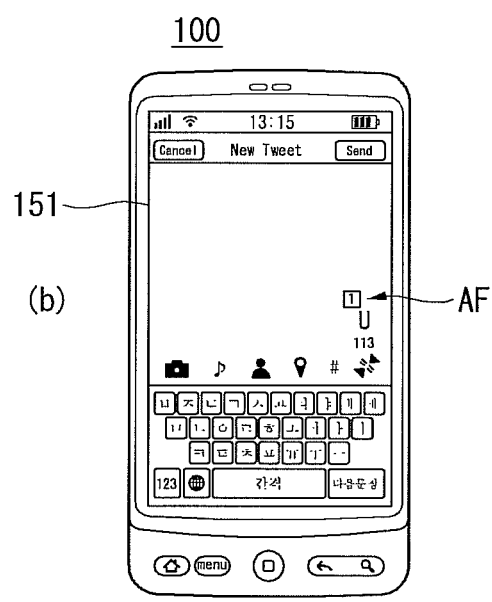

FIG. 40
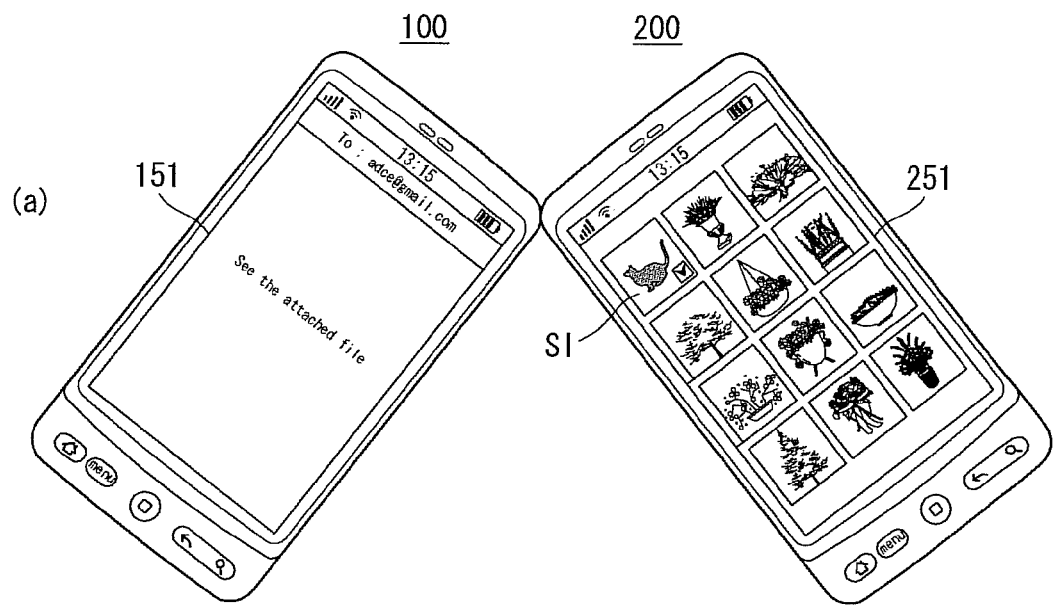
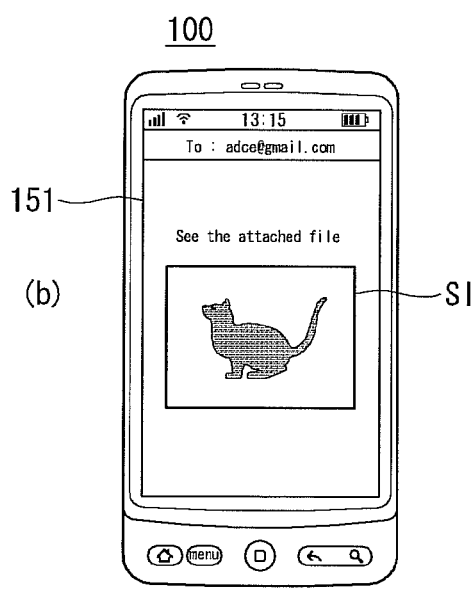

FIG. 41
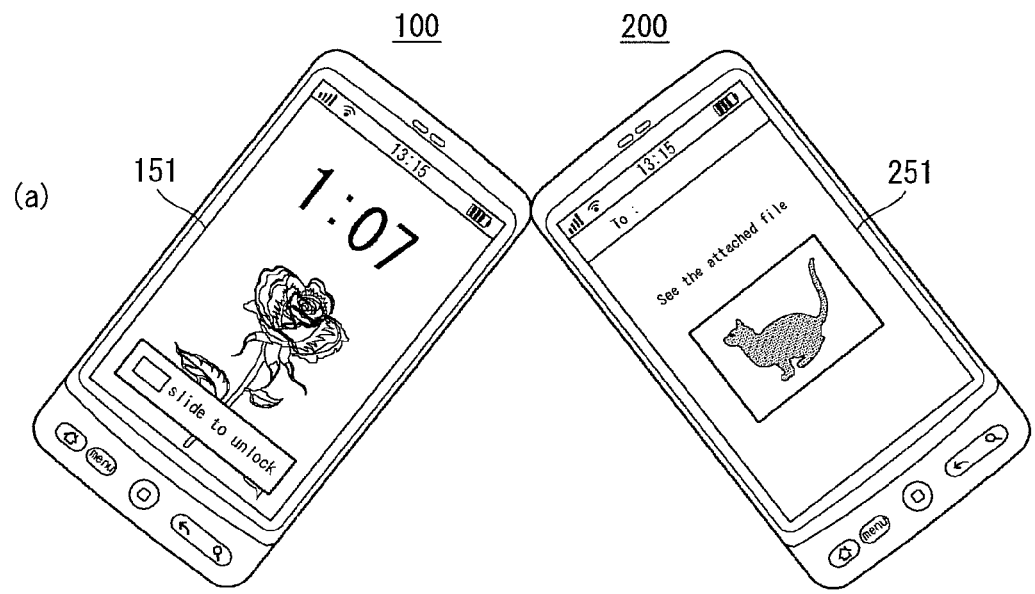
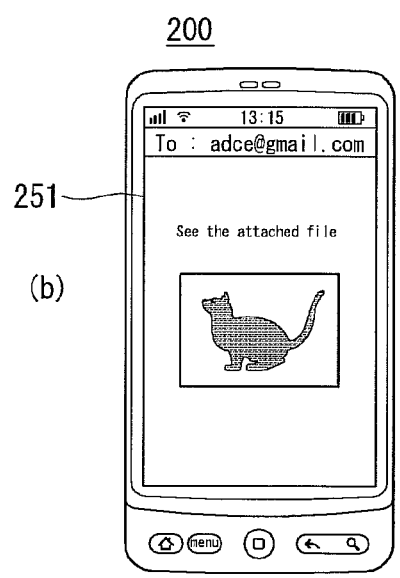

FIG. 43
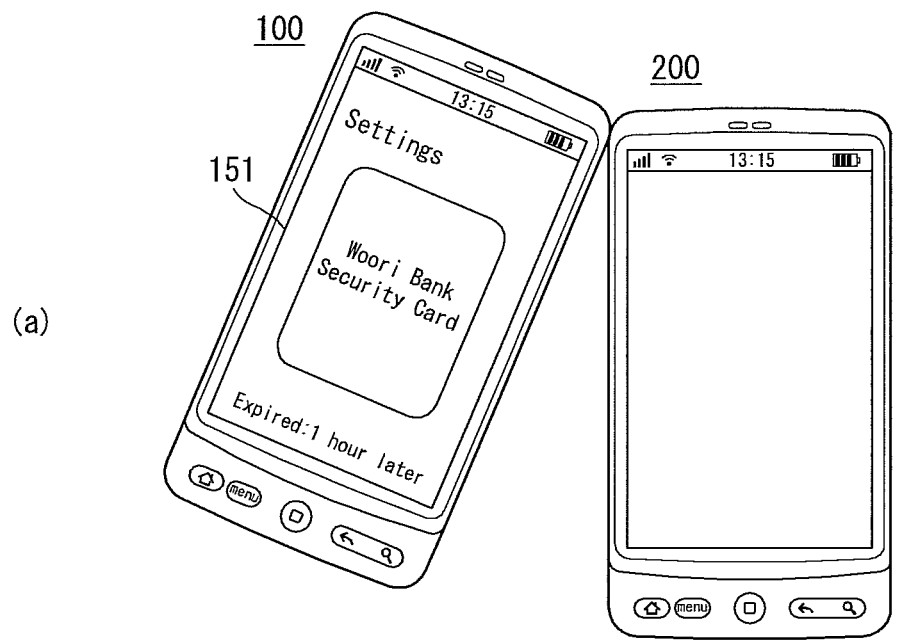
(a)
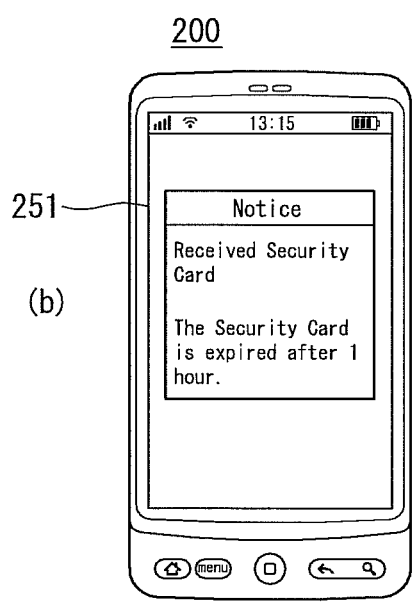
(b)

MOBILE TERMINAL AND METHOD OF CONTROLLING THE SAME

CROSS-REFERENCE TO RELATED APPLICATION

This application claims benefit and priority from Korean Patent Application No. 10-2011-0079396, filed Aug. 10, 2011, the subject matter of which is hereby incorporated by reference.

BACKGROUND

1. Field

Embodiments of the present invention may relate to a mobile terminal and a method of controlling a mobile terminal. The mobile terminal may easily transmit and receive data in a determined direction based on a result received from a sensing unit.

2. Background

As functions of terminals such as personal computers, laptop computers, cellular phones diversify, the terminals may become multimedia players having multiple functions for capturing pictures or moving images, playing music, moving image files and games and/or receiving broadcasting programs.

Terminals may be mobile terminals and/or stationary terminals. The mobile terminals may be handheld terminals and/or vehicle mount terminals based on whether users may personally carry the terminals. Terminals including mobile terminals may provide an increased number of complex and various functions.

BRIEF DESCRIPTION OF THE DRAWINGS

Arrangements and embodiments may be described in detail with reference to the following drawings in which like reference numerals refer to like elements wherein:

FIGS. 10 to 12 are diagrams showing a process of determining a data transmission direction of the mobile terminal;

FIGS. 15 and 16 are diagrams showing an example of determining a data transmission direction of the mobile terminal;

FIGS. 18 to 22 are diagrams of a process of coupling and displaying data of the mobile terminal;

FIGS. 23 to 25 are diagrams showing an example of coupling and displaying data of the mobile terminal;

FIGS. 33 and 34 are diagrams of an example of coupling and displaying data of the mobile terminal;

FIGS. 35 to 38 are diagrams of a method of coupling data of the mobile terminal;

FIGS. 39 and 40 are diagrams of an example of coupling and displaying data of the mobile terminal of FIG. 7;

FIG. 41 is a diagram showing transmitting data of the mobile terminal; and

FIGS. 42 and 43 are diagrams showing a limitation of transmitting data of the mobile terminal.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
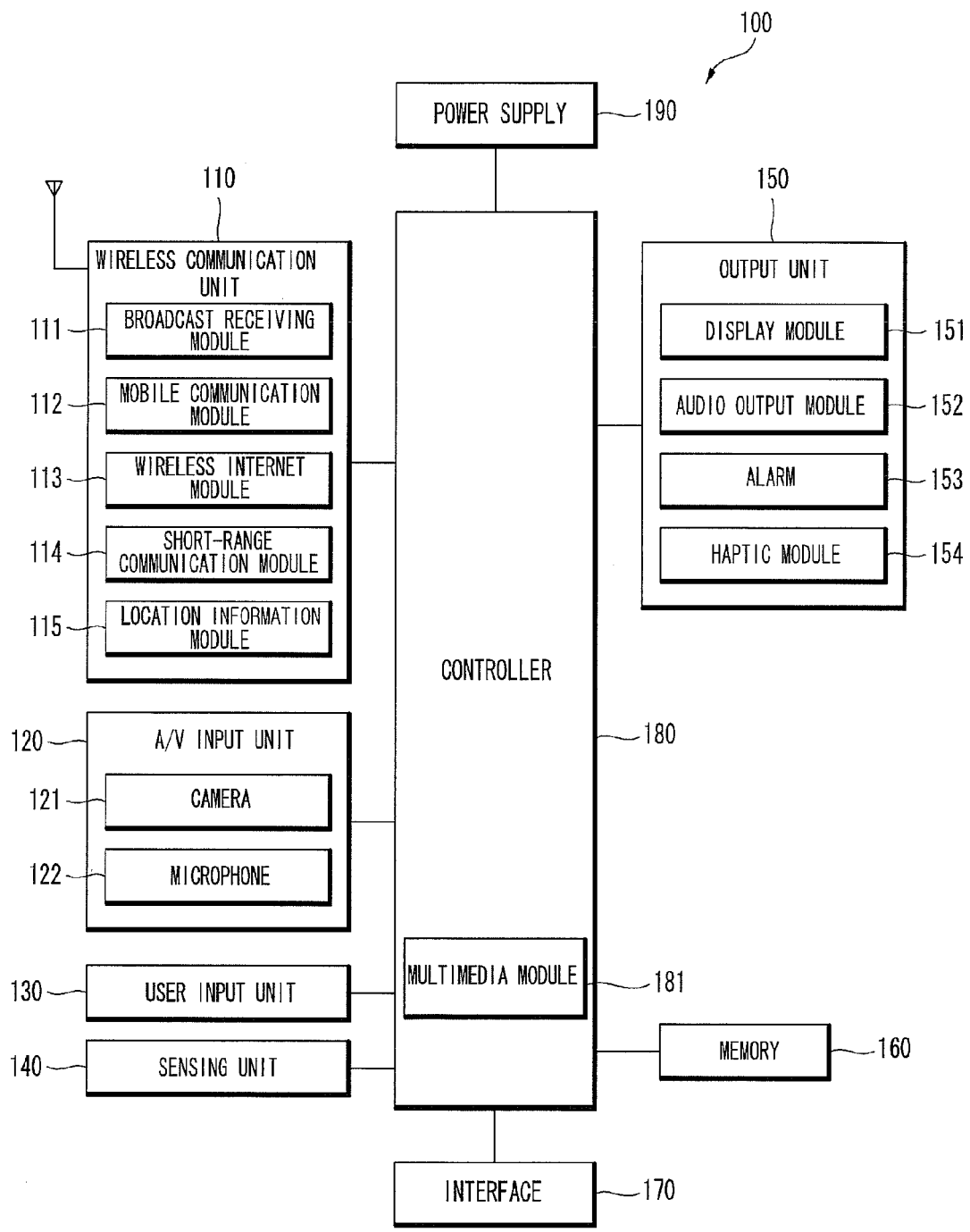
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (NV) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
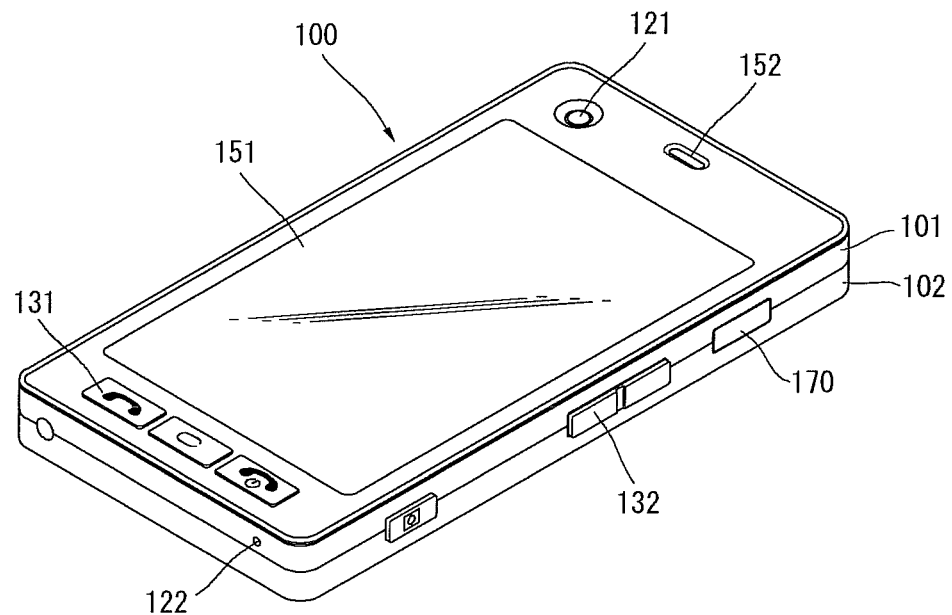
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
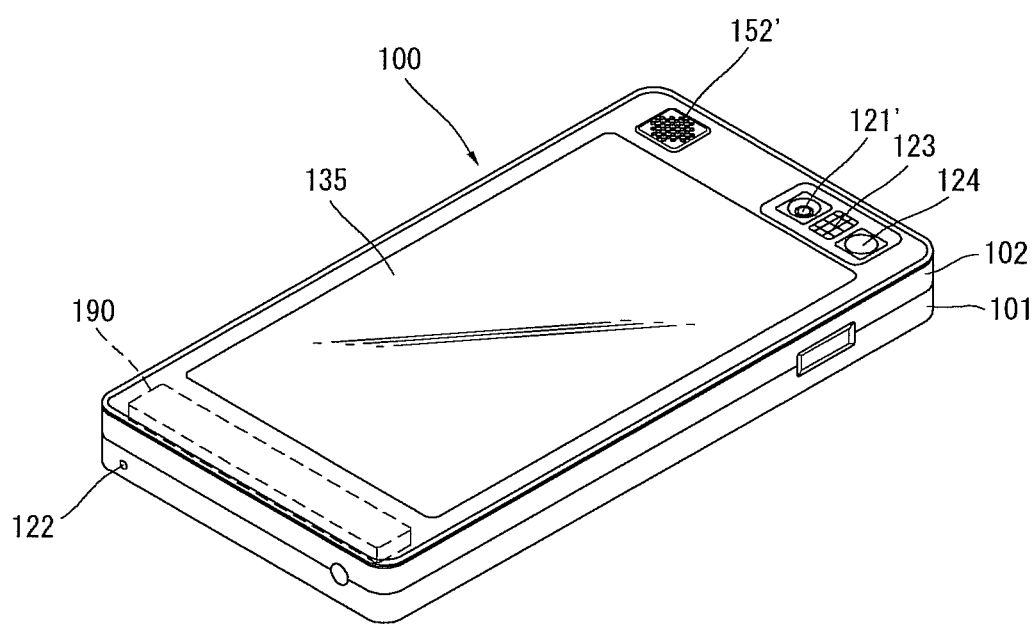
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 2C:
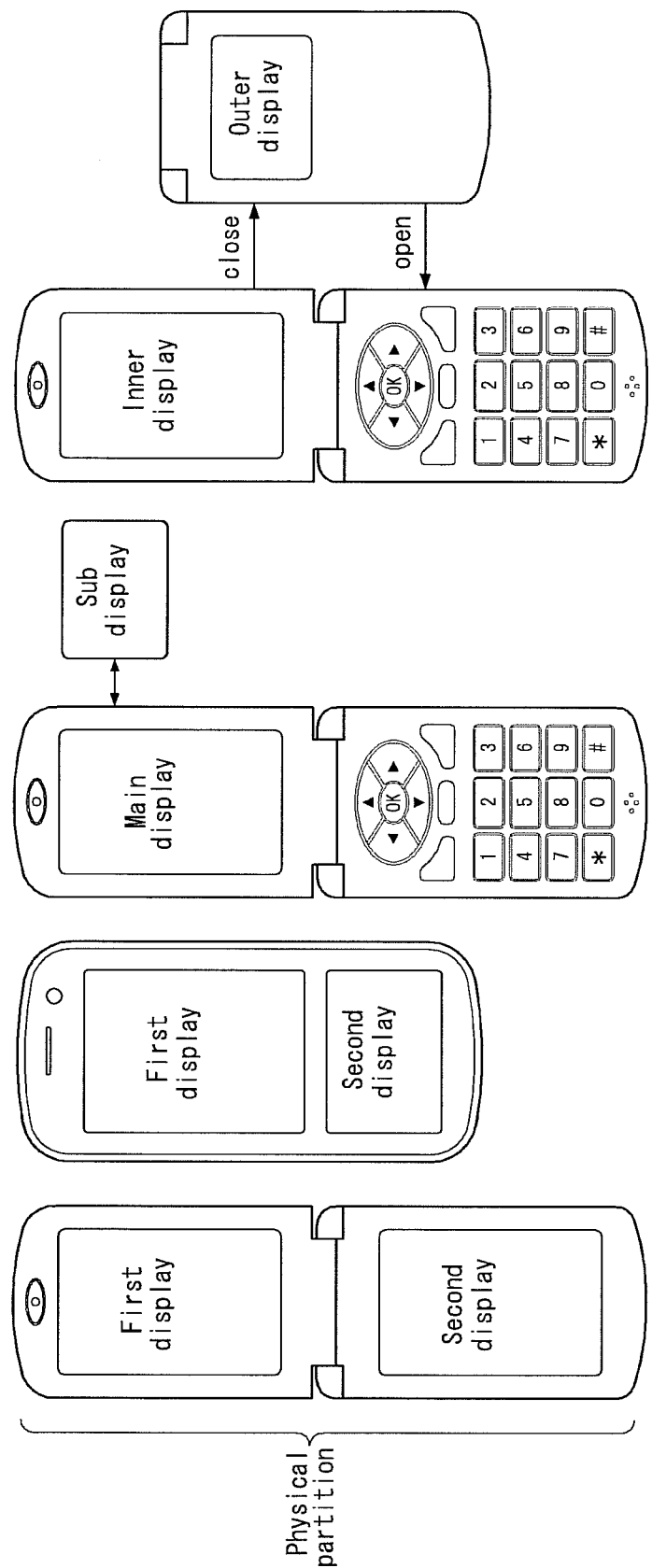
FIGS. 2C and 2D illustrate forms of the mobile terminal and display screens according to various embodiments.
Figure 2D:
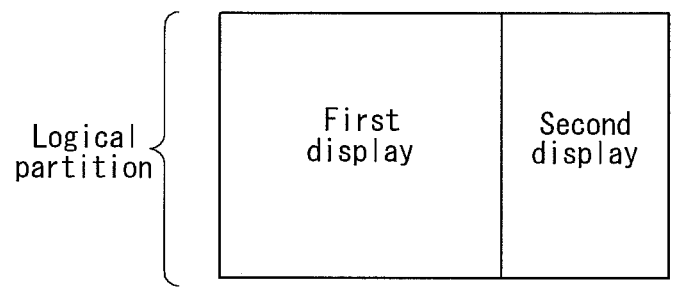

FIGS. 2C and 2D illustrate the mobile terminal 100 and the display 151 according to various embodiments.

Referring to FIG. 2C, the display 151 may include a first display and a second display that are physically separated from each other. In a folder type or slide type mobile terminal having two bodies connected through a hinge or a slide, the first display (or main display) may be formed on the inner face or outer face of one of the bodies, and the second display (or sub display) may be formed on the inner face or outer face of the other body. The sub display may be separated from the mobile terminal and may be detachably combined with the mobile terminal body through an interface to display data from the mobile terminal 100.

The display 151 may include first and second displays that may be logically separated from each other in a display panel, as shown in FIG. 2D.

Figure 3:
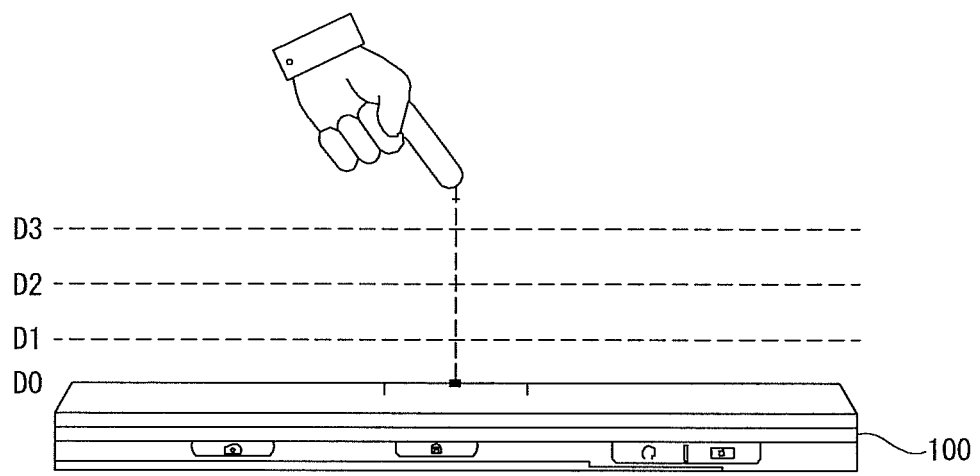
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 4:
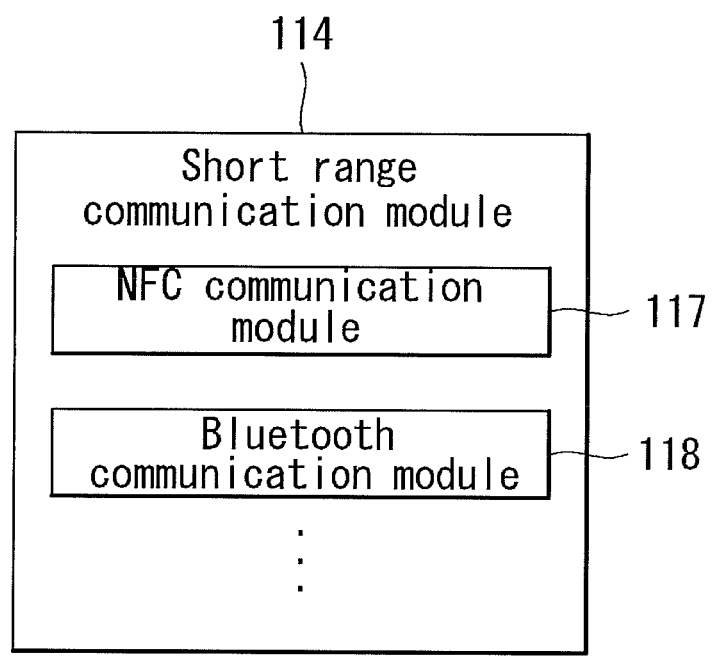
FIG. 4 is a block diagram showing a short range communication module of a mobile terminal according to an embodiment.

FIG. 4 is a block diagram showing a short range communication module 114 of the mobile terminal 100 according to an embodiment. As shown in FIG. 4, the short range communication module 114 may include a near field communication (NFC) module 117, a Bluetooth communication module 118 and so on.

The NFC communication module 117 may perform data communication with devices positioned at a distance within 10 cm (preferably within 4 cm) using very short-range contactless data transfer technology related to radio frequency identification (RFID). An electronic device that adapts NFC technology may communicate with another electronic device that adapts NFC technology through at least one of a reader mode, a card emulation mode, and/or a pier to pier mode, for example. The NFC communication module 117 may be described with reference to FIG. 5.

The Bluetooth communication module 118 may perform data communication with devices within a radius 10 to 100 m using Bluetooth, which is one type of short range wireless communication formats. For reference, Bluetooth is short range wireless networking technology that was developed by a Bluetooth special interest group (SIG).

The block diagram shown in FIG. 4 is an example of the short range communication module 114 according to the present embodiment, and elements of the short range communication module 114 may not be essential elements. The short range communication module 114 may include elements more than or fewer than shown in FIG. 4.

Figure 5:
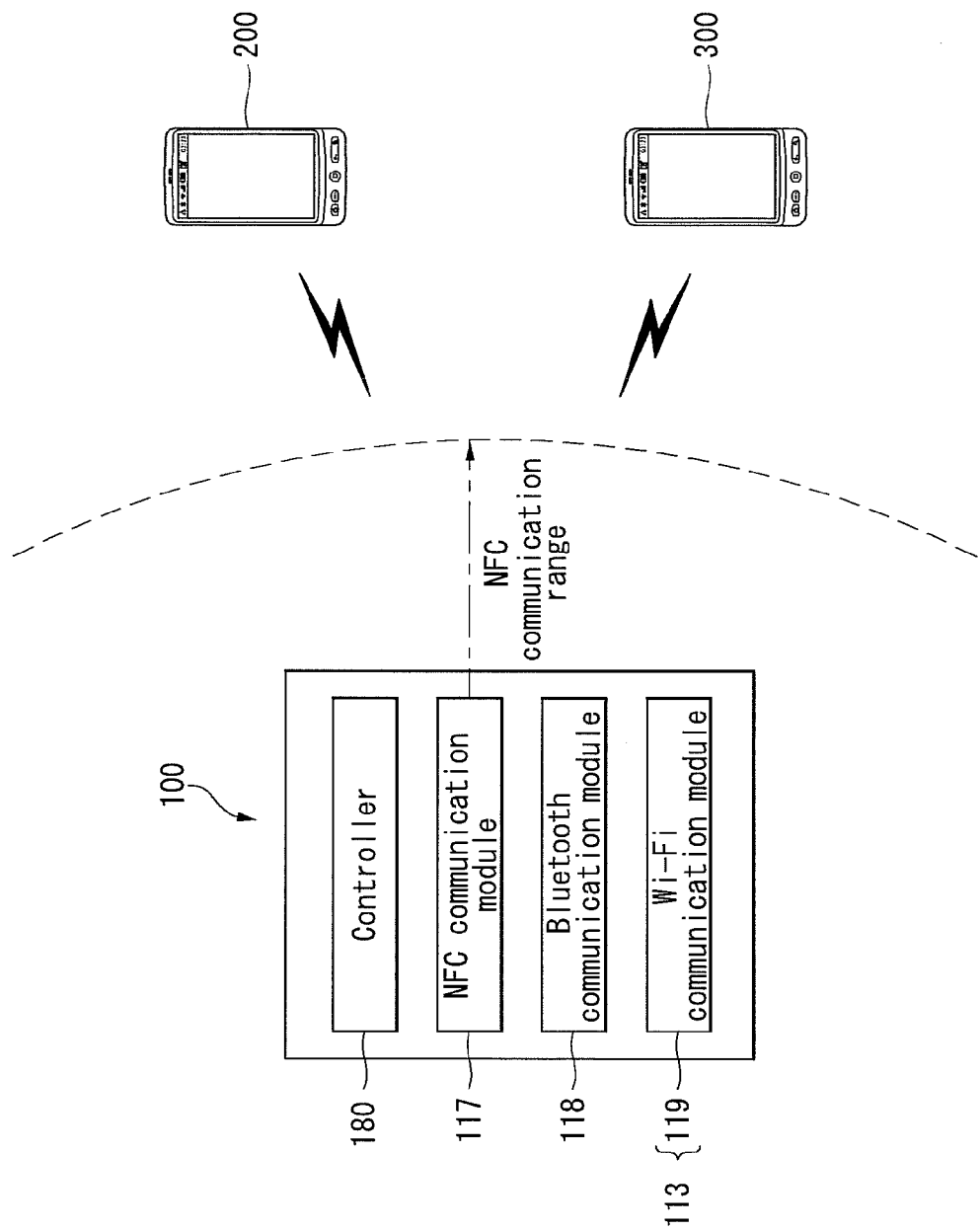
FIG. 5 is a diagram showing a system environment including a mobile terminal according to an embodiment.

FIG. 5 is a diagram illustrating a system environment that includes the mobile terminal 100. As shown in FIG. 5, the system environment may be formed with the mobile terminal 100 and one or more other electronic devices 200 and 300 that may form an NFC link with the mobile terminal 100. The electronic devices 200 and 300 may be mobile terminals.

The system environment may include elements fewer than or more than shown in FIG. 5. In FIG. 5, in order to describe a communication link forming a characteristic of the mobile terminal 100, only certain elements for forming a communication link may be shown.

In FIG. 5, the system environment may be formed with mobile terminals, although electronic devices described herein may be a random electronic device for supporting NEC communication. That is, the electronic devices 200, and 300 may be a mobile terminal such as a mobile phone, a smart phone, and/or a tablet PC for supporting NFC communication, and/or may be an electronic device such as a printer, a television, a digital television, a computer, and/or an audio device. An electronic device having a NFC communication function may be referred to as an NFC electronic device.

In FIG. 5, the mobile terminal 100 may form an NFC link with the other electronic devices 200 and 300 based on NFC communication technology, which is a type of short range communication technology, although a range is not limited thereto. For example, the mobile terminal 100 may form a wireless communication link with the other electronic devices 200 and 300 using short range wireless communication technology other than NFC communication technology.

Referring to FIG. 5, the mobile terminal 100 may include the controller 180, the NFC communication module 117, the Bluetooth communication module 118, and/or a Wi-Fi communication module 119.

The controller 180 may control elements within the mobile terminal 100. The NFC communication module 117 may enable the mobile terminal 100 to form an NFC link with other electronic devices 200 and 300 that support NFC communication. The NFC communication module 117 may indicate an NFC forum device. The NFC communication module 117 may be referred to as a short range communication means.

As shown in FIG. 5, the NFC communication module 117 may form an NFC link through tagging with an NFC communication module of the other electronic devices 200 and 300 that are within an NFC communication range.

The NFC communication module 117 may communicate in various modes with the NFC communication module of the other electronic devices 200 and 300. For example, the various modes may include a card emulation mode, a reader mode, and/or a peer to peer mode, for example.

When the NFC communication module 117 operates in the card emulation mode, the NFC communication module 117 (of the mobile terminal 100) may function as a card (i.e., a tag). In this example, the NFC communication module of the other electronic devices 200 and 300 may operate in a reader mode and may acquire data from the NFC communication module 117 of the mobile terminal 100.

When the NFC communication module 117 operates in the reader mode, the NFC communication module 117 (of the mobile terminal 100) may function as a reader. In this example, the NFC communication module 117 of the mobile terminal 100 may acquire data from the NFC communication module of the other electronic devices 200 and 300 operating in an emulation mode.

When the NFC communication module 117 operates in the peer to peer mode, the NFC communication module 117 (of the mobile terminal 100) and the NFC communication module of the other electronic devices 200 and 300 may exchange data.

A mode of the NFC communication module 117 may be determined according to a predetermined reference. For example, a mode of the NFC communication module 117 may be set based on a user input, or a predetermined algorithm.

The mobile terminal 100 may form an NFC link through the NFC communication module 117 with the other electronic devices 200 and 300, and then may form a communication link, different from the NFC link, with the other electronic devices 200 and 300 through the Bluetooth communication module 118 and/or the Wi-Fi communication module 119. Therefore, even if the NFC communication link is disconnected, the mobile terminal 100 may continue to perform data communication with the other electronic devices 200 and 300 through the Bluetooth communication module 118 and/or the Wi-Fi communication module 119.

After the NFC link is formed, a series of processes of forming another communication link in order to enable the mobile terminal 100 to continue to communicate with the other electronic devices 200 and 300 using other wireless communication technology may be referred to as handover.

Referring to FIG. 5, in the mobile terminal 100, a handover may be performed from an NFC communication link to a Bluetooth communication link or a Wi-Fi communication link, although a range is not limited thereto. For example, the mobile terminal 100 may perform a handover to various communication links, such as an RFID communication link and a wireless gigabit (WiGig) communication link.

Although not shown in FIG. 5, the other electronic devices 200 and 300 may include elements corresponding to the mobile terminal 100. For example, the other electronic devices 200 and 300 may include a controller, an NFC communication module, a Bluetooth communication module, and/or a Wi-Fi communication module.

The handover may indicate that the mobile terminal 100 performs data communication by forming an NFC link and then forming another communication link with the other electronic devices 200 and 300, and a user may easily form an NFC link through NFC tagging between the mobile terminal 100 and the other electronic devices 200 and 300 and change a communication means to an alternate communication link appropriate for transmitting a longer distance and/or a greater amount of data than the NFC link.

A handover process of the mobile terminal 100 may be described with reference to the drawings. For ease of description, a handover process may be described with reference to the system environment shown in FIG. 5. Embodiments are not limited to a specific environment or a specific device.

Figure 6:
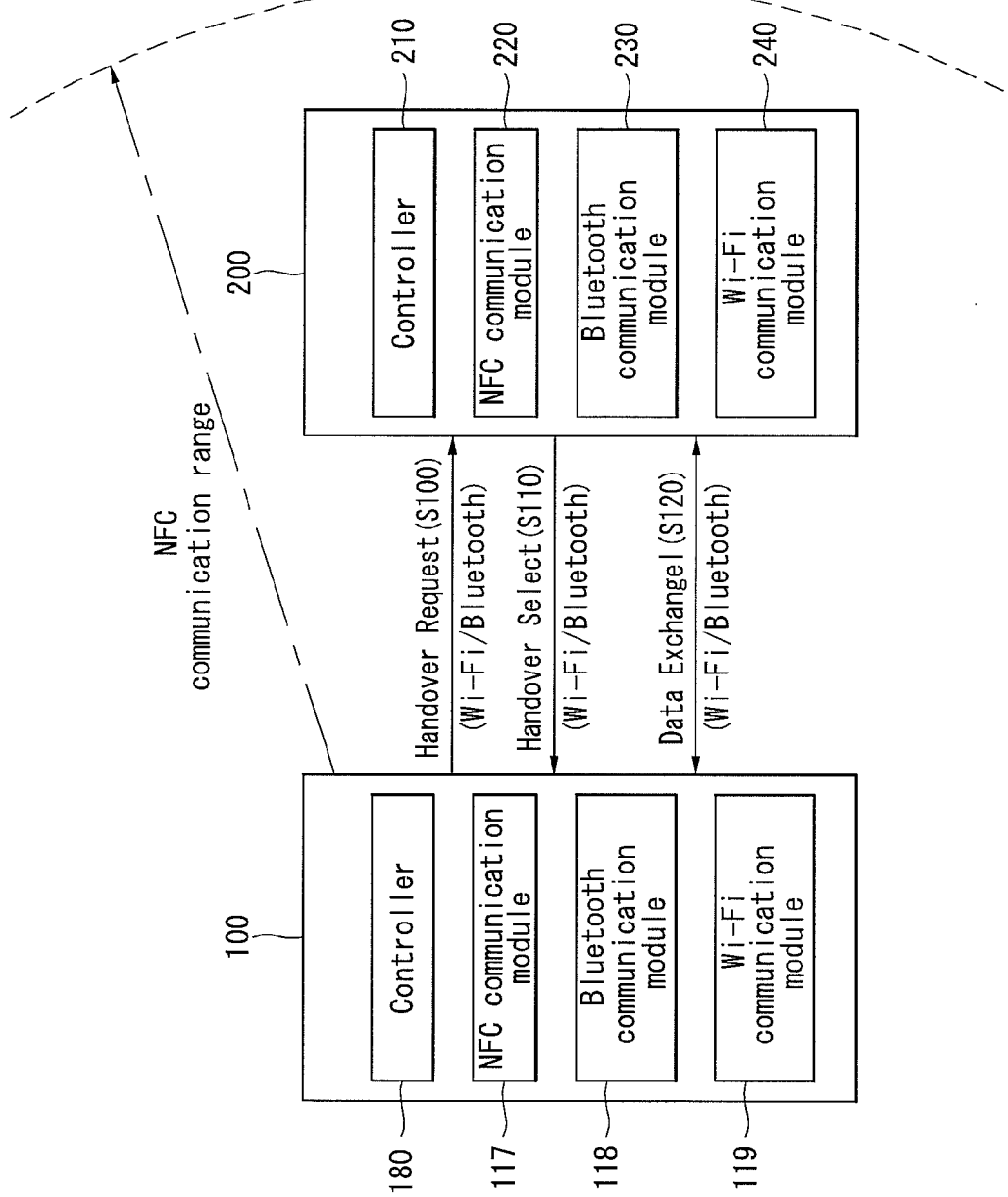
FIG. 6 illustrates an example in which a mobile terminal according to an embodiment forms a communication link with another electronic device.

FIG. 6 illustrates an example in which the mobile terminal 100 forms a communication link with the another electronic device 200. A process of forming a communication link may be described with reference to the drawings.

Referring to FIG. 6, the mobile terminal 100 may transmit a handover request message to the another electronic device 200 (S110). Before operation S110, the mobile terminal 100 and the another electronic device 200 may form a communication link through a first communication means. As one example, the mobile terminal 100 may form an NFC link through tagging to an NFC communication module 220 included in the another electronic device 200.

When the NFC link is formed, the mobile terminal 100 may transmit a message (e.g. a handover request message) for a handover request to the another electronic device 200 through the NFC link.

As the mobile terminal 100 transmits the handover request message to the another electronic device 200, the mobile terminal 100 and the another electronic device 200 may start a protocol for forming another communication link through the NFC link formed between the mobile terminal 100 and the another electronic device 200.

The mobile terminal 100 may be a handover requester, and the another electronic device 200 may be a handover selector. The handover requester may be a device for starting a handover protocol by transmitting a handover request message to another NFC electronic device. The handover selector may be an NFC device for writing and responding with a handover selection message as a response to the received handover request message.

That is, the handover requester (i.e., a handover request device) and the handover selector (i.e., a handover selection device) may be relative concepts to be determined based on transmission of a handover request message or transmission of a handover selection message. Therefore, when the another electronic device 200 transmits a handover request message to the mobile terminal 100 based on a situation, the mobile terminal 100 may be a handover selector and the another electronic device 200 may be a handover requester.

The handover request message may include information about another communication module that is supported by the mobile terminal 100. For example, as shown in FIG. 6, when the mobile terminal 100 supports Bluetooth and/or Wi-Fi, the handover request message may include information about Bluetooth and/or Wi-Fi that are supported by the mobile terminal 100.

A priority order may be set to communication technology used for handover and that is supported by the mobile terminal 100. For example, as shown in FIG. 6, the handover request message may have information about a communication module for supporting communication technology having a high priority order at a front thereof and that has information about a communication module for supporting communication technology having a low priority order at a rear thereof. Referring to the handover request message (shown in FIG. 6), it may be determined that information about a Wi-Fi communication module has a priority order higher than information about a Bluetooth communication module.

Another electronic device 200 having received the handover request message, may transmit a response to the handover request message to the mobile terminal 100 (S120). For example, the another electronic device 200 may generate a handover selection message as an example of a response to the handover request message through the NFC link, and may transmit the generated handover selection message to the mobile terminal 100.

The another electronic device 200 may determine a communication module included in the mobile terminal 100 by analyzing the handover request message and based on the determination may provide information about a communication module included in the another electronic device 200 to the mobile terminal 100. That is, information about a communication module included in the handover selection message may include information about a communication module included in the another electronic device 200 from among communication modules included in the mobile terminal 100.

Referring to FIG. 6, a controller 210 of the another electronic device 200 may determine that the Bluetooth communication module 118 and the Wi-Fi communication module 119 are included in the mobile terminal 100 by analyzing the received handover request message and transmitting a handover selection message including information about a Bluetooth communication module 230 and a Wi-Fi communication module 240 included in the another electronic device 200 to the mobile terminal 100.

When a handover selection message is received from the another electronic device 200, the controller 180 of the mobile terminal 100 may determine that the Bluetooth communication module 230 and the Wi-Fi communication module 240 are included in the another electronic device 200 by analyzing the handover selection message and may receive (or acquire) information thereof.

Thereafter, the mobile terminal 100 may form a communication link with communication modules included in the another electronic device 200 based on the received information, and the mobile terminal 100 may perform data communication with the another electronic device 200 through the formed communication link (S120).

For example, in order to change an NFC communication link with the another electronic device 200 to the Bluetooth communication link, the controller 180 (of the mobile terminal 100) may perform a Bluetooth pairing with the another electronic device 200. Thereby, the mobile terminal 100 may continue to perform communication according to a Bluetooth protocol by converting a communication link with the another electronic device 200 from the NFC communication link to the Bluetooth communication link.

As handover of a communication link between the mobile terminal 100 and the another electronic device 200 is performed, the NFC communication link to the Bluetooth communication link, data communication may be performed, and data may be exchanged with a transmission speed faster than the NFC link, even if the mobile terminal 100 and the another electronic device 200 are no longer positioned within an NFC communication range (shown in FIG. 6).

In other words, when the mobile terminal 100 is a smart phone, the user may bring the smart phone to a periphery of the another electronic device 200 and may perform tagging with the another electronic device 200, and thus an NFC link may be formed, and by performing a handover protocol, a communication means may be changed to the Bluetooth communication link. Therefore, even if the user takes a smart phone out of an NFC communication range, the smart phone and the another electronic device 200 may continue to perform data communication using the Bluetooth communication link.

Further, the controller 180 (of the mobile terminal 100) may perform a process of forming a Wi-Fi communication link with the another electronic device 200 in order to change the NFC communication link with the another electronic device 200 to the Wi-Fi communication link and perform data communication with the another electronic device 200 through the formed Wi-Fi communication link. Therefore, the mobile terminal 100 may perform data communication with the another electronic device 200 even outside a NFC communication range with a data transmission and reception speed faster than the NFC communication link.

In this example, when a plurality of communication links exist that may be changed from the NFC communication link, the controller 180 (of the mobile terminal 100) may perform handover for only a communication link selected from the plurality of communication links and may perform handover to the plurality of communication links. Further, when a communication link for performing a handover is selected from a plurality of communication links, the controller 180 may select a communication link according to a predetermined priority order.

Figure 7:
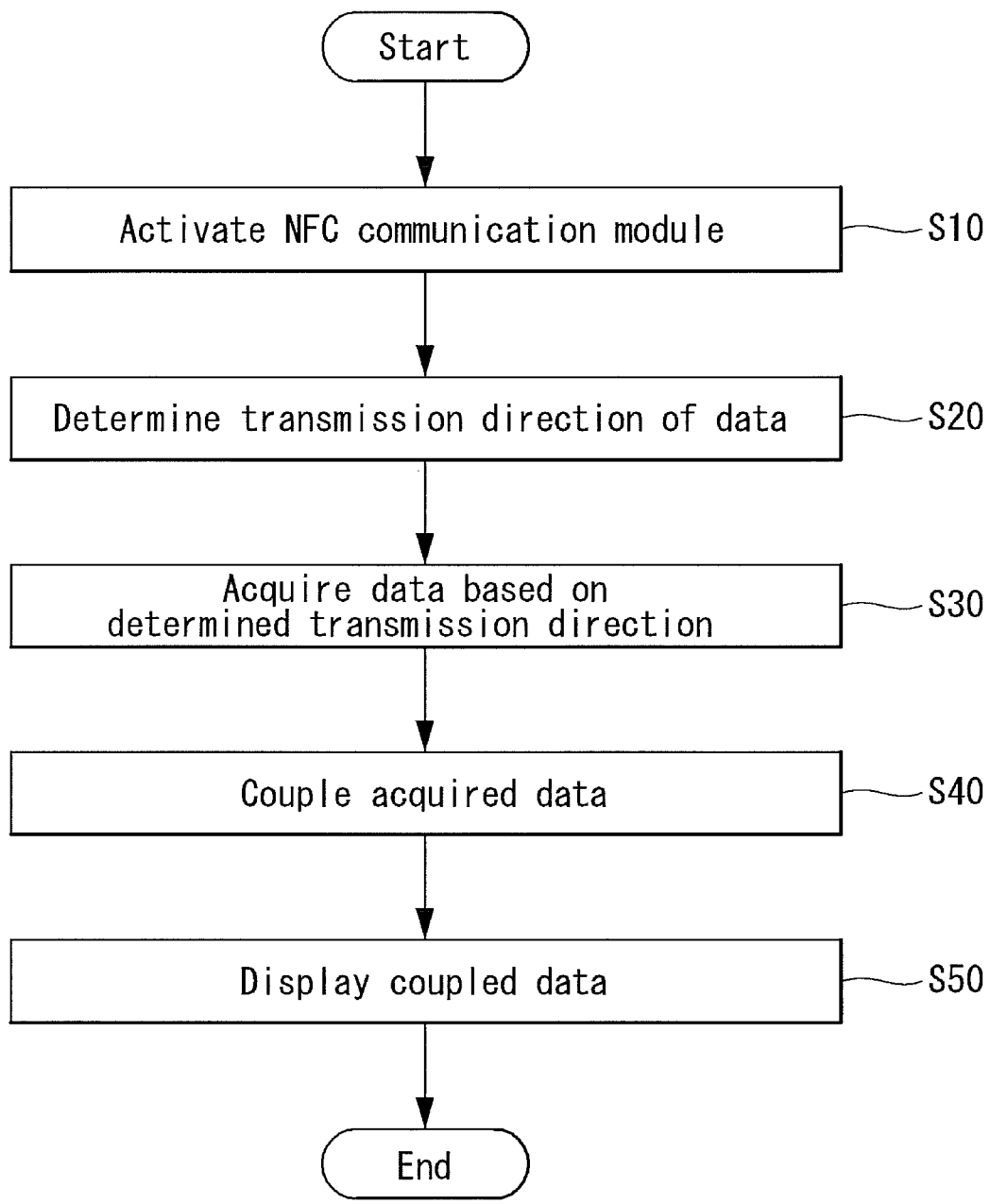
FIG. 7 is a flowchart showing operation of the mobile terminal (of FIG. 1)

FIG. 7 is a flowchart of an operation of the mobile terminal.

As shown in FIG. 7, the controller 180 may activate the NFC communication module 117 (S10).

The NFC communication module 117 may be selectively activated or inactivated by a user's selection and/or a control operation of the controller 180. For example, in a situation in which a NFC communication is not used, because electricity is not supplied to the NFC communication module 117, consumption of a battery may be reduced. Therefore, when the NFC communication module 117 is inactivated, in order to perform communication of an NFC method, the NFC communication module 117 may be activated.

The controller 180 may determine a transmission direction of data (S20).

Data may be transmitted from the mobile terminal 100 to another terminal through the NFC communication module, or data may be transmitted from another terminal to the mobile terminal 100 through the NFC communication module 117.

A transmission direction of data may be determined based on the user's manipulation form of a main body of the mobile terminal 100. For example, a transmission direction of data may be determined by an action of colliding the mobile terminal 100 with another terminal. That is, when performing an action of colliding the mobile terminal 100 with another terminal in a stationary state at a specific position by moving the mobile terminal 100, data of the mobile terminal 100 may be transmitted to the another terminal.

A transmission direction of data may be determined based on a form advancing into an area in which a NFC communication is available. For example, when the mobile terminal 100 enters into an NFC area of another terminal waiting for NFC communication, data of the mobile terminal 100 may be transmitted to another terminal.

A transmission direction of data may be determined based on a form in which the user performs a touch. For example, when a drag touch action is performed from one direction to another direction on the display 151, data of the mobile terminal 100 may be transmitted to another terminal in an advancing direction of a drag touch action.

When a transmission direction of data is determined, the controller 180 may receive (or acquire) data based on the determined transmission direction (S30).

Data may be information stored in the memory 160. For example, data may be a text, an image, and/or a moving picture stored in the memory 160.

When a transmission direction of data is determined from another terminal to the mobile terminal 100, a text, for example, may be transmitted from the another terminal to the mobile terminal 100. That is, the mobile terminal 100 may receive (or acquire) data from the other terminal based on a determined direction.

Operation S40 of coupling the acquired (or received) data and operation S50 of displaying the coupled data may be performed.

The controller 180 may couple the received data (S40). For example, the mobile terminal 100 may couple the received information to previously stored information in the memory 160. Alternatively, the mobile terminal 100 may couple first information received from a first terminal and second information received from a second terminal.

The controller 180 may generate data of a new form by coupling the received data. Therefore, a cooperation of generating one data as a plurality of persons separately operate in a plurality of electronic devices may be performed. The controller 180 may control the display 151 to display the coupled data (S50).

Figure 8:
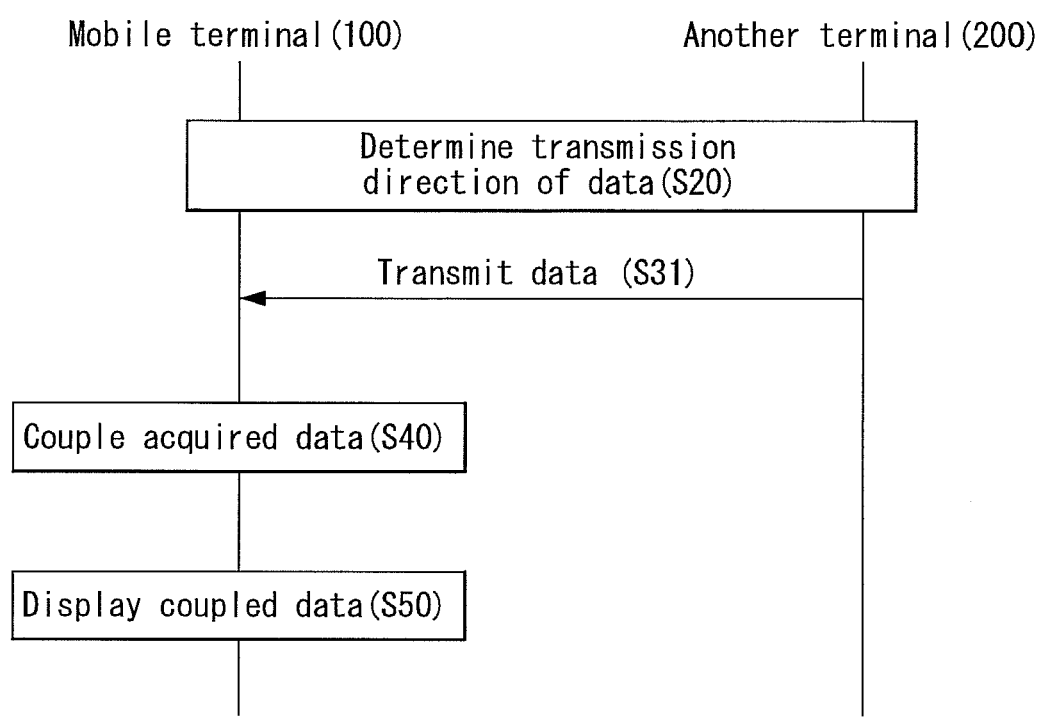
FIG. 8 is a message flow diagram between another terminal and the mobile terminal (of FIG. 1)

FIG. 8 is a message flow diagram between another terminal and the mobile terminal (of FIG. 1).

As shown in FIG. 8, the mobile terminal 100 and the another terminal 200 may determine a transmission direction of data (S20).

A transmission direction of data may be determined by a control operation performed between the mobile terminal 100 and the another terminal 200. For example, as described above, a transmission direction of data may be determined based on an action of colliding the mobile terminal 100 with the another terminal 200, moving the mobile terminal 100 into an NFC communication area of the another terminal 200, and/or performing a specific touch action in the mobile terminal 100.

When a transmission direction of data is determined from the another terminal 200 to the mobile terminal 100, the another terminal 200 may transmit data to the mobile terminal 100 (S31).

Data may be transmitted through communication using a NFC method. Furthermore, data may be transmitted by handover from communication using a NFC method to communication using a Wi-Fi method.

When data is received, the mobile terminal 100 may couple the acquired (or received) data (S40), and the mobile terminal 100 may display the coupled data (S50).

Figure 9:
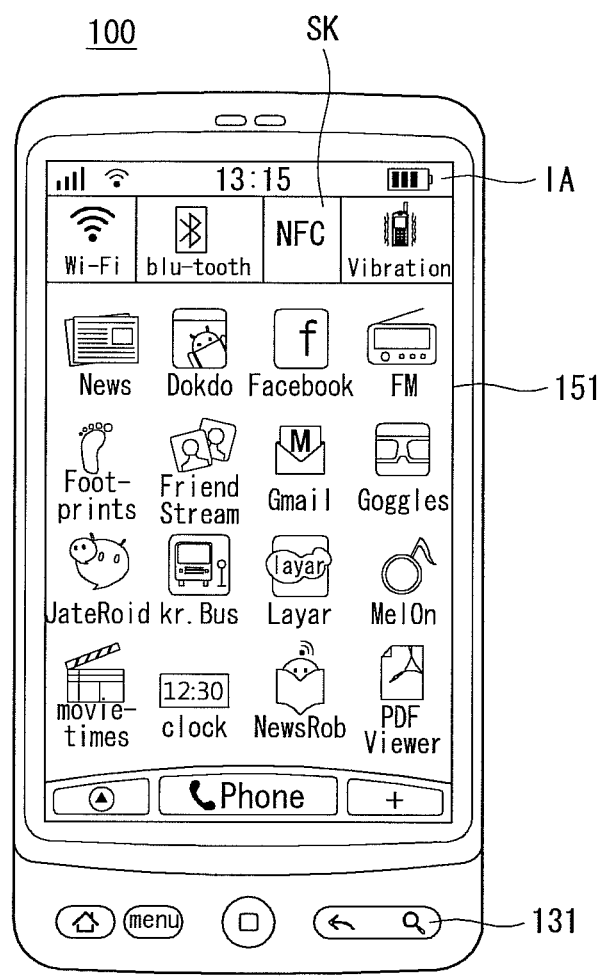
FIG. 9 is a diagram showing near field communication (NFC) activation of the mobile terminal.

FIG. 9 is a diagram showing an NFC activation of the mobile terminal.

As shown in FIG. 9, the controller 180 may control the display 151 to display a soft key SK for activating a NFC communication.

The soft key SK may be selectively displayed in the display 151. For example, when a user performs a touch action of dragging an indicator area IA of the display 151 in a lateral direction and/or in a vertical direction, the soft key SK may be displayed. When the user again performs the same touch action, the displayed soft key SK may disappear.

When activation of a specific function is toggled, the soft key SK may be selected. For example, when the soft key SK is touched one time, the NFC communication module 117 may be activated, and when the soft key SK is touched again, the NFC communication module 117 may be inactivated. The soft key SK may include a button corresponding to other functions in which the user frequently uses in addition to a button related to the NFC communication module 117.

NFC communication may be activated through a key button 131 provided in a surface of the mobile terminal 100. For example, when an action of pressing the physical key button 131 is performed, the controller 180 may activate or inactivate the NFC communication module 117.

Figure 11:
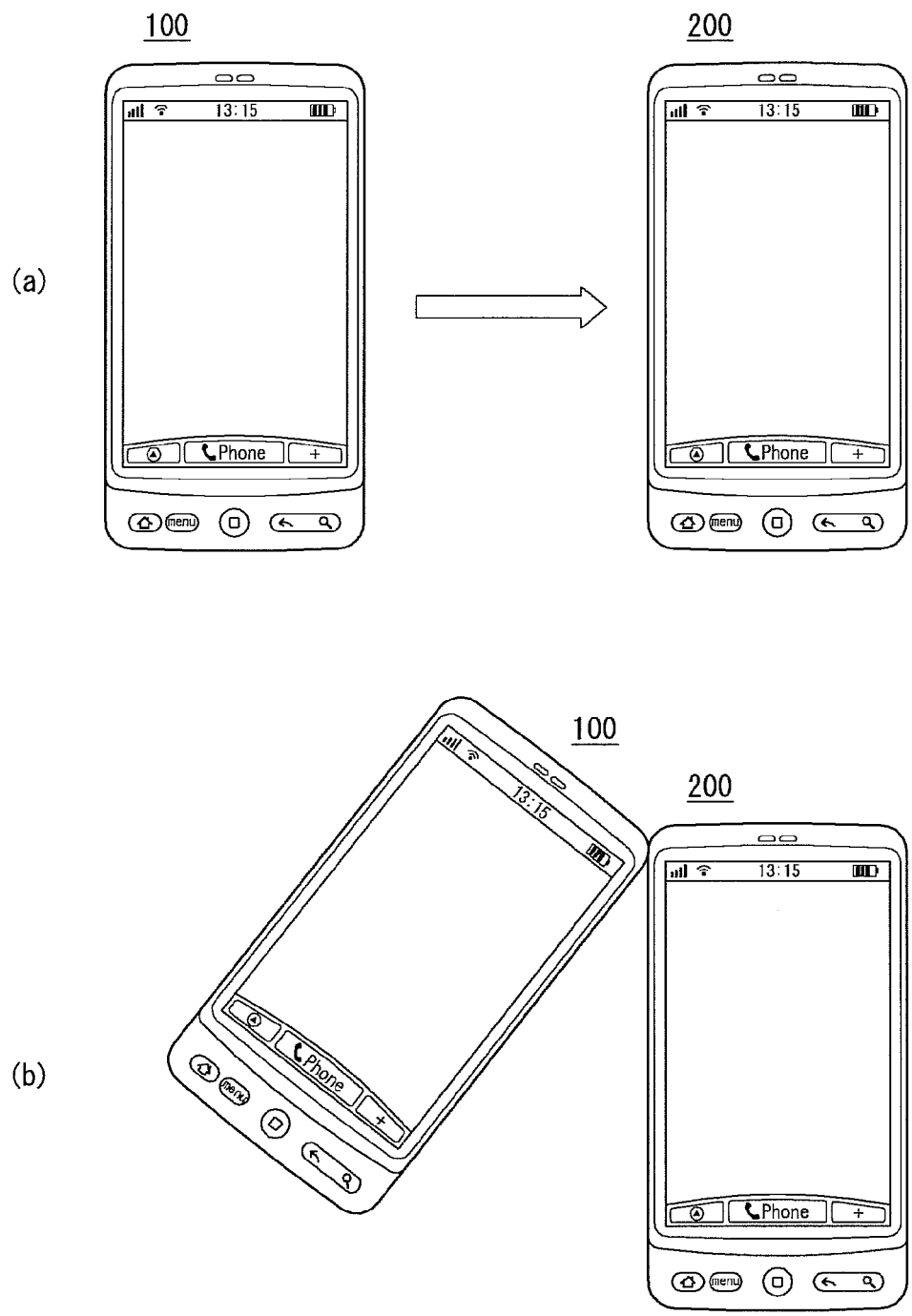

FIGS. 10 to 12 are diagrams of a process of determining a data transmission direction of the mobile terminal.

As shown in FIGS. 10 to 12, the mobile terminal 100 may determine a transmission direction of data based on a colliding action of the mobile terminal 100 and the another terminal 200.

As shown in FIG. 10A, the mobile terminal 100 may be in a stationary state at a specific position, and the another terminal 200 may move toward the mobile terminal 100.

Movement of the mobile terminal 100 may be detected by an acceleration sensor, a terrestrial magnetism sensor, and/or a magnetic sensor included in the sensing unit 140. By a combination of an acceleration sensor, a terrestrial magnetism sensor, and/or a magnetic sensor, the sensing unit 140 may detect a change according to movement of the mobile terminal 100. That is, a stationary state and a moving state of the mobile terminal 100 may be detected by the sensing unit 140. A description in which the sensing unit 140 detects movement of the mobile terminal 100 may be applied to the another terminal 200. For example, as shown in FIG. 10A, when the mobile terminal 100 stops and the another terminal 200 moves, controllers of the mobile terminal 100 and the another terminal 200 may determine, based on a detection value of the sensing unit 140, that a corresponding device is moving or stops.

As shown in FIG. 10B, the moving another terminal 200 may collide with the mobile terminal 100 that is stopped at a specific position. At a collision moment, controllers of the two devices may determine which terminal collides with which terminal based on a detection result of the sensing unit 140. For example, in an example of FIG. 10B, as the mobile terminal 100 stops and the another terminal 200 moves, the mobile terminal 100 and the another terminal 200 may collide. In such an example, the user may have an intention to move data from the another terminal 200 to the mobile terminal 100.

As shown in FIGS. 11A and 11B, the user may collide the another terminal 200 and the mobile terminal 100 by moving the mobile terminal 100 to the stationary another terminal 200. In this example, when the mobile terminal 100 collides with the stationary another terminal 200, the user may have an intention to move data from the mobile terminal 100 to the another terminal 200.

As shown in FIGS. 12A and 12B, the user may collide the mobile terminal 100 and the another terminal 200 by moving both the mobile terminal 100 and the another terminal 200. In this example, when two terminals 100 and 200 move and collide, the user may have an intention to exchange data of the two terminals 100 and 200.

Figure 13:
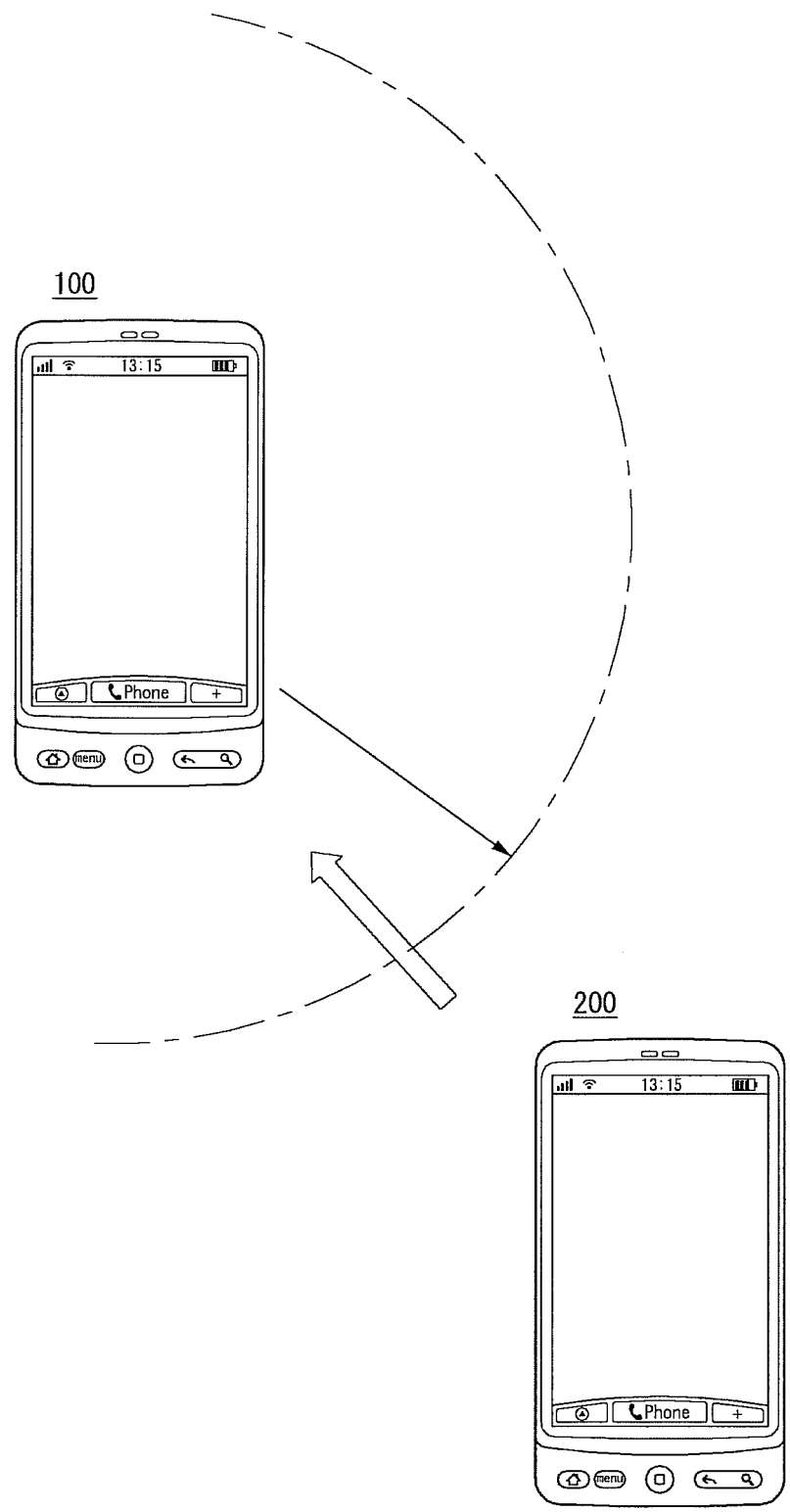
FIGS. 13 and 14 are diagrams showing an example of determining a data transmission direction of the mobile terminal.
Figure 14:
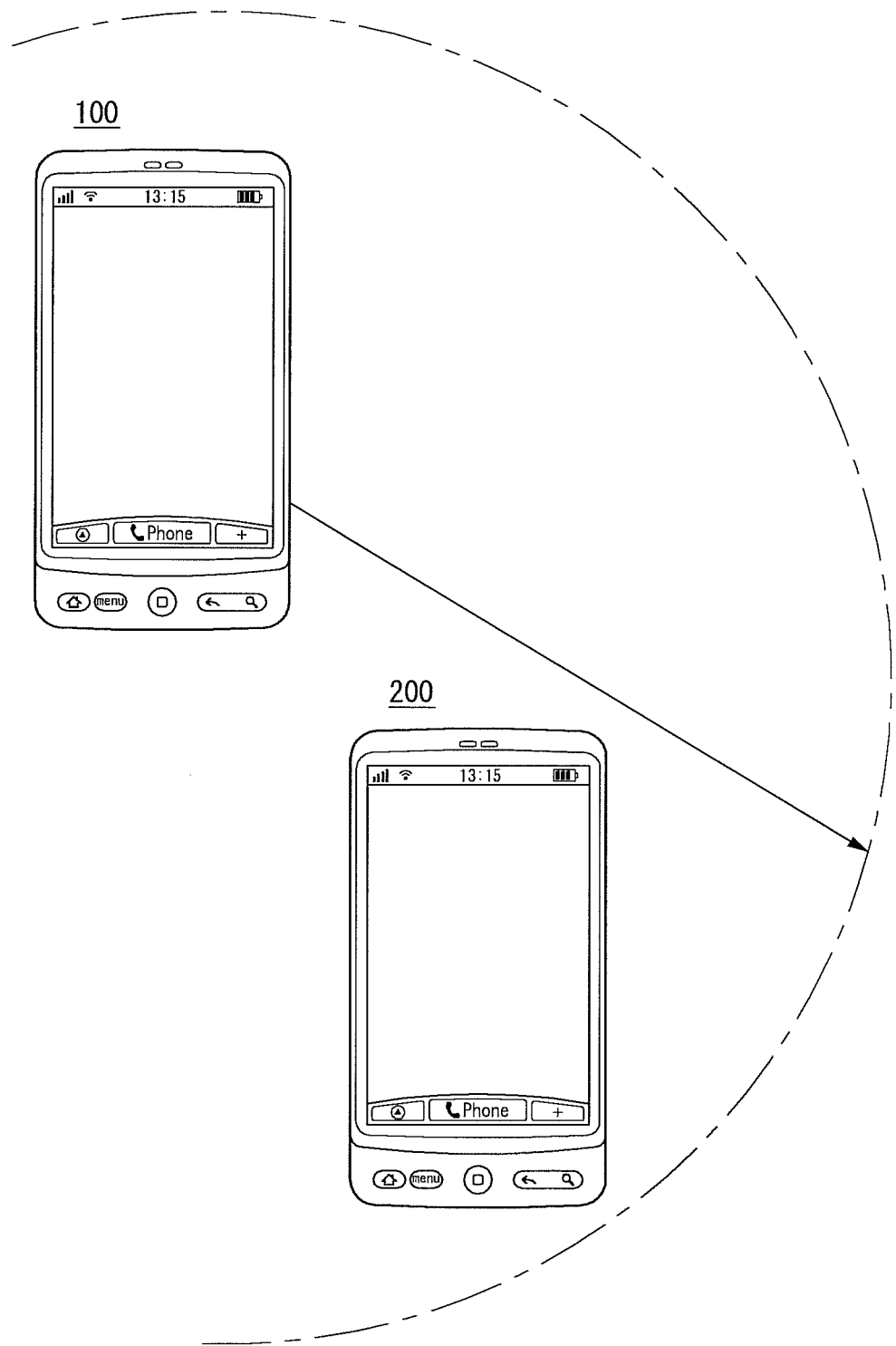

FIGS. 13 and 14 are diagrams of an example of determining a data transmission direction of the mobile terminal.

As shown in FIGS. 13 and 14, a transmission direction of data may be determined according to whether the mobile terminal 100 enters an available area of NFC communication.

As shown in FIG. 13, an available field of a NFC communication may be formed within a predetermined radius of the mobile terminal 100. The user may move the another terminal 200 into an area that may perform a NFC communication with the mobile terminal 100.

As shown in FIG. 14, the another terminal 200 may move into an area in which the mobile terminal 100 may perform a NFC communication. In a state where the mobile terminal 100 stops, when the another terminal 200 moves into an available area of a NFC communication, the user may have an intention to transmit data from the another terminal 200 to the mobile terminal 100.

FIGS. 15 and 16 are diagrams of an example of determining a data transmission direction of the mobile terminal.

As shown in FIGS. 15 and 16, the mobile terminal 100 may determine a data transmission direction based on a touch action.

As shown in FIGS. 15A and 15B, the user may perform a touch action of touching the display 151 with a finger F and dragging in a direction of the another terminal 200. In this example, the mobile terminal 100 and the another terminal 200 may be adjacently positioned or positioned a predetermined distance away from each other.

Data may move in a direction of a touch action of the user. For example, in an example of FIGS. 15A and 15B, data may be transmitted from the mobile terminal 100 to the another terminal 200.

As shown in FIG. 16, other terminals 201 to 204 may be positioned at a periphery of the mobile terminal 100. The user may perform a drag touch action in a specific direction in the display 151 with a finger F. Data of the mobile terminal 100 may be transmitted to at least one of the other terminals 201 to 204 based on a direction of a drag touch action.

Figure 17:
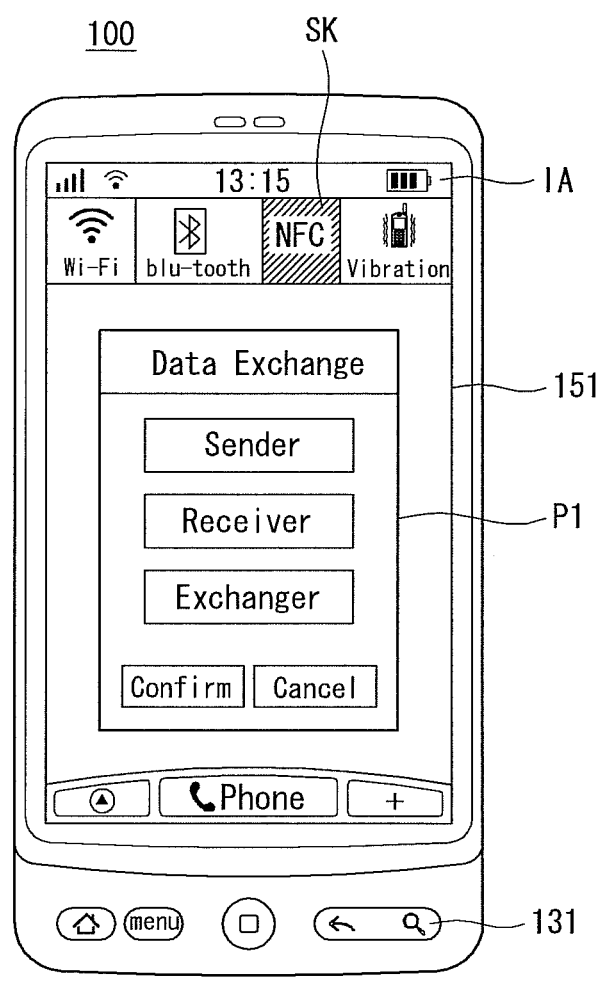
FIG. 17 is a diagram showing an example of determining a data transmission direction of the mobile terminal.

FIG. 17 is a diagram of an example of determining a data transmission direction of the mobile terminal.

As shown in FIG. 17, the mobile terminal 100 may determine a transmission direction of data based on a selection using a first pop-up window P1.

The first pop-up window P1 may display a menu for selecting whether the mobile terminal 100 is to operate as a transmitting side, operate as a receiving side, and/or perform a data exchange operation. The user may determine an operation of the mobile terminal 100 by selecting a specific menu.

FIGS. 18 to 22 are diagrams of a process of coupling and displaying data of the mobile terminal.

As shown in FIGS. 18 to 22, the mobile terminal 100 may transmit and couple data based on a determined data transmission direction.

As shown in FIG. 18A, the user may enable the another terminal 200 to collide with the mobile terminal 100. That is, the user may have an intention to transmit data from the another terminal 200 to the mobile terminal 100.

Contents to be transmitted or coupled may be stored in the mobile terminal 100 and the another terminal 200. Hereinafter, for ease of description, contents of the mobile terminal 100 may be represented as A and contents of the another terminal 200 may be represented as B.

When the another terminal 200 collides with the mobile terminal 100, data of the another terminal 200 may be transmitted to the mobile terminal 100.

As shown in FIG. 19B, the controller 180 may control the display 151 to display contents B, which are data received from the another terminal 200. For example, the display 151 may be divided into a first area D1 representing contents A stored in the mobile terminal 100 and a second area D2 representing received contents B.

First and second delete buttons C1 and C2 may be positioned at the first and second areas D1 and D2, respectively. A detailed function of the first and second delete buttons C1 and C2 may be described in a related portion.

As shown in FIG. 19A, the user may perform a touch action of touching the first area D1 and dragging to the lower side of the second area D2.

As shown in FIG. 19B, the order of contents displayed in the display 151 by a drag touch action of the user may change. That is, as the user performs an appropriate drag touch action, the order of contents displayed in the display 151 may change.

As shown in FIG. 20A, the user may perform an action of touching the first delete button C1 of the first area D1 with a finger F.

As shown in FIG. 20B, when the user selects the first delete button C1, the display of the first area D1 may disappear.

As shown in FIG. 21A, the user may enable another terminal 300 to collide with the mobile terminal 100.

As shown in FIG. 21B, contents C of the another terminal 300 may be transmitted to the mobile terminal 100 based on the collision. The transmitted contents C may be displayed in the third area D3.

As shown in FIG. 22A, the user may perform an action of touching a point other than second and third areas D2 and D3. That is, in the display 151, an action of touching a point other than the second and third areas D2 and D3 may be performed.

As shown in FIG. 22B, when the user performs an action of touching a point other than the second and third areas D2 and D3, editing of contents B and C may be terminated. That is, the contents B and C may be completely stored in the mobile terminal 100.

Figure 25:
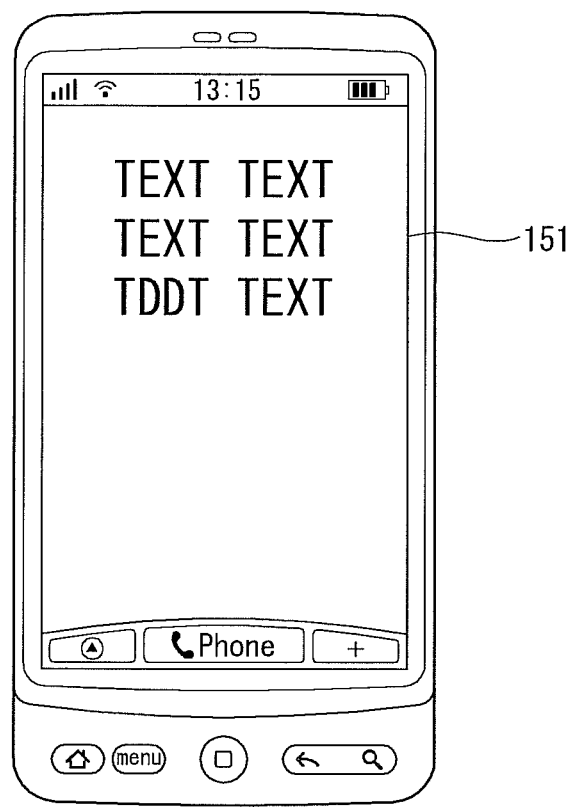

FIGS. 23 to 25 are diagrams of an example of coupling and displaying data of the mobile terminal.

As shown in FIGS. 23 to 25, when the mobile terminal 100 receives (or acquires) similar contents, different portions of the contents may be displayed.

As shown in FIG. 23A, when the another terminal 200 collides with the mobile terminal 100, contents of the another terminal 200 may be transmitted to the mobile terminal 100.

As shown in FIG. 23B, the controller 180 (of the mobile terminal 100) may compare contents stored in the mobile terminal 100 and the received contents and may display different portions. For example, a form of first and second texts DT1 and DT2 may have been stored in the mobile terminal 100, but a form of first and second other texts DP1 and DP2 may be received (or acquired) from the another terminal 200.

As the controller 180 differently displays colors of the first and second texts DT1 and DT2 and the first and second other texts DP1 and DP2, the user may easily recognize the difference thereof.

As shown in FIG. 24A, the user may select a desired portion from the first text DT1 and the first other text DP1 using a finger F.

As shown in FIG. 24B, when the user selects the first text DT1, the first other text DP1 may disappear and only the first text DT1 may be displayed in the display 151. The user may select the second other text DP2 with the finger F.

As shown in FIG. 25, when the user selects the second other text DP2, only the selected second other text DP2 may be displayed.

Figure 26:
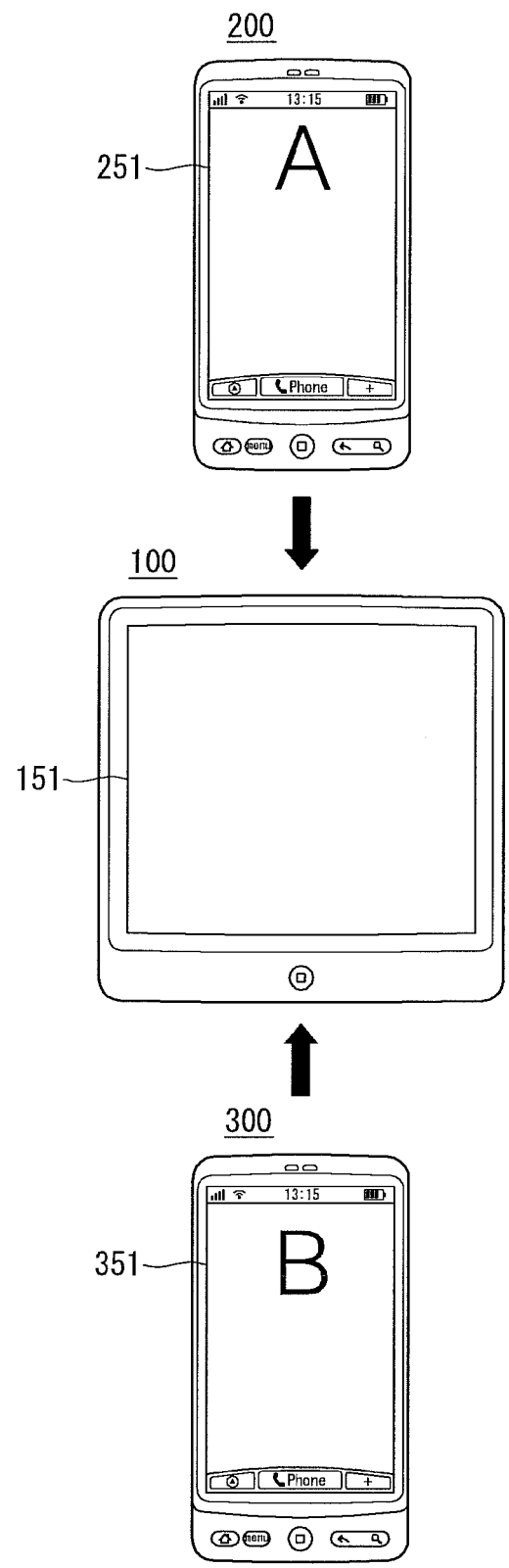
FIGS. 26 and 27 are diagrams showing an example of coupling and displaying data of the mobile terminal.
Figure 27:
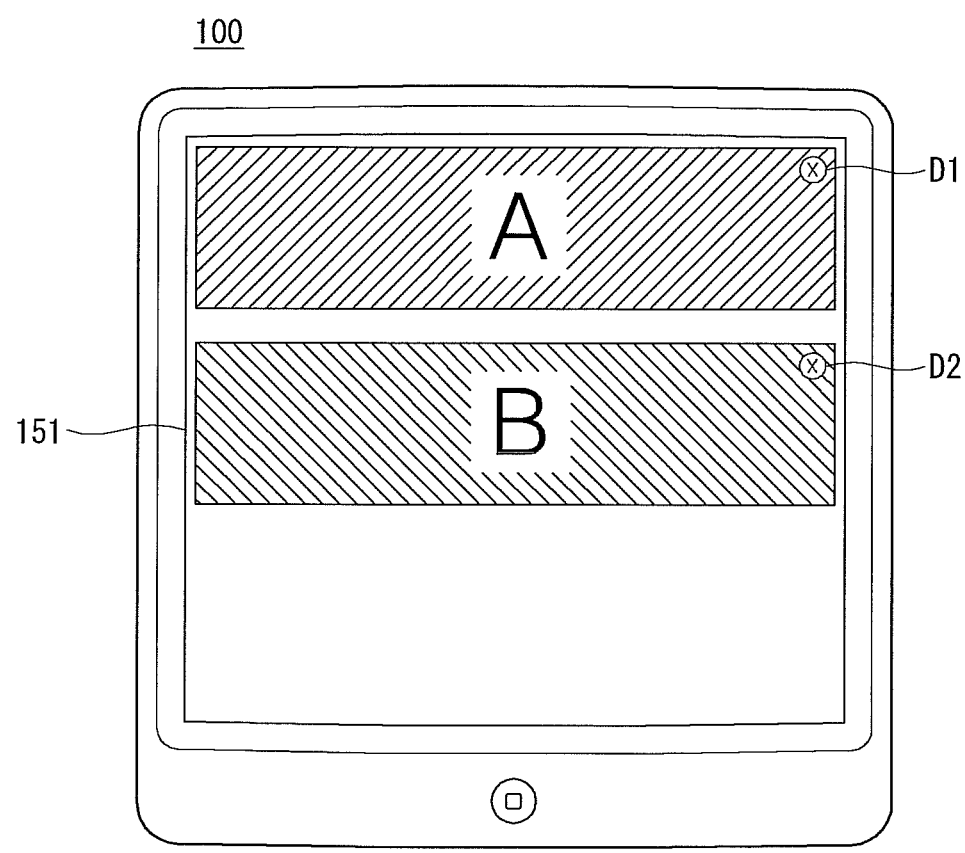

FIGS. 26 and 27 are diagrams of an example of coupling and displaying data of the mobile terminal.

As shown in FIGS. 26 and 27, the mobile terminal 100 may receive (or acquire) and display contents from a plurality of other terminals 200 and 300.

As shown in FIG. 26, the mobile terminal 100 may be a tablet PC. That is, the mobile terminal 100 may have the display 151 that is wider than a common display. Contents A and B may be stored in the first and second other terminals 200 and 300, respectively. The mobile terminal 100 may receive substantially simultaneously data from the first and second other terminals 200 and 300.

As shown in FIG. 27, the mobile terminal 100 may display substantially simultaneously received contents in the display 151.

Figure 28:
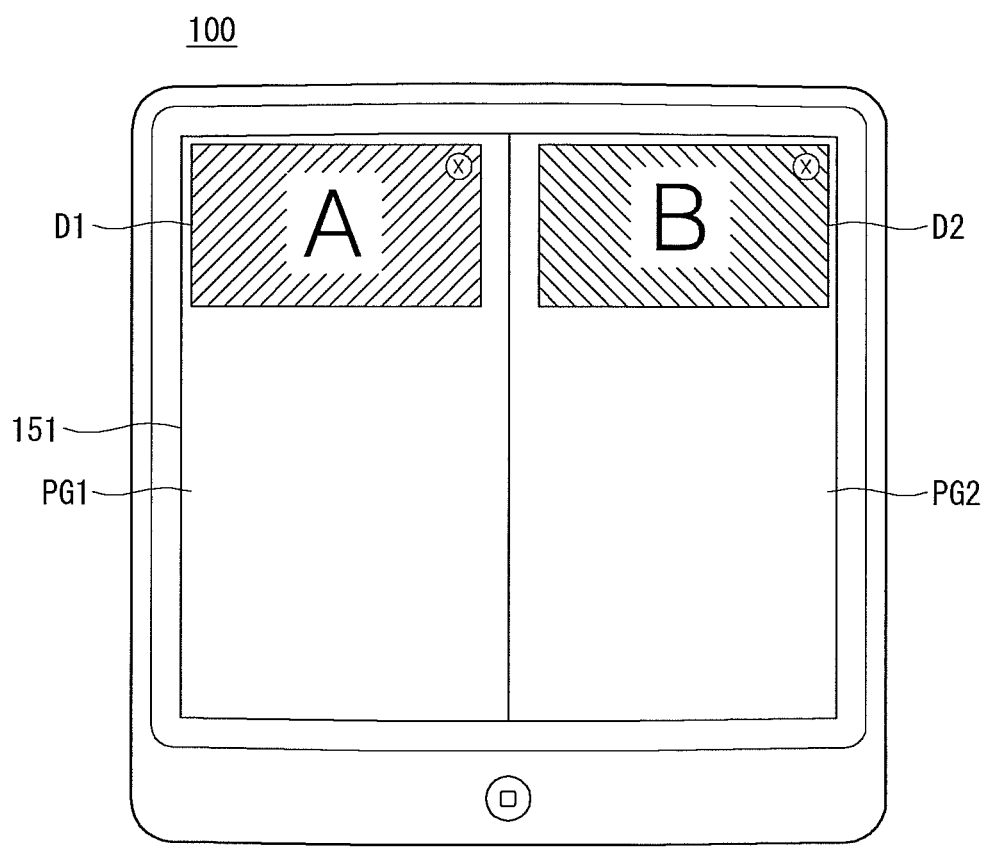
FIG. 28 is a diagram of an example of coupling and displaying data of the mobile terminal.

FIG. 28 is a diagram of an example of coupling and displaying data of the mobile terminal.

As shown in FIG. 28, the mobile terminal 100 may display received (or acquired) contents with various methods. That is, the display 151 may be vertically divided, and contents received (or acquired) from the first another terminal 200 may be displayed in a first area D1 of a first display area PG1, and contents received (or acquired) from the second other terminal 300 may be displayed in a second area D2 of a second display area PG2.

Figure 29:
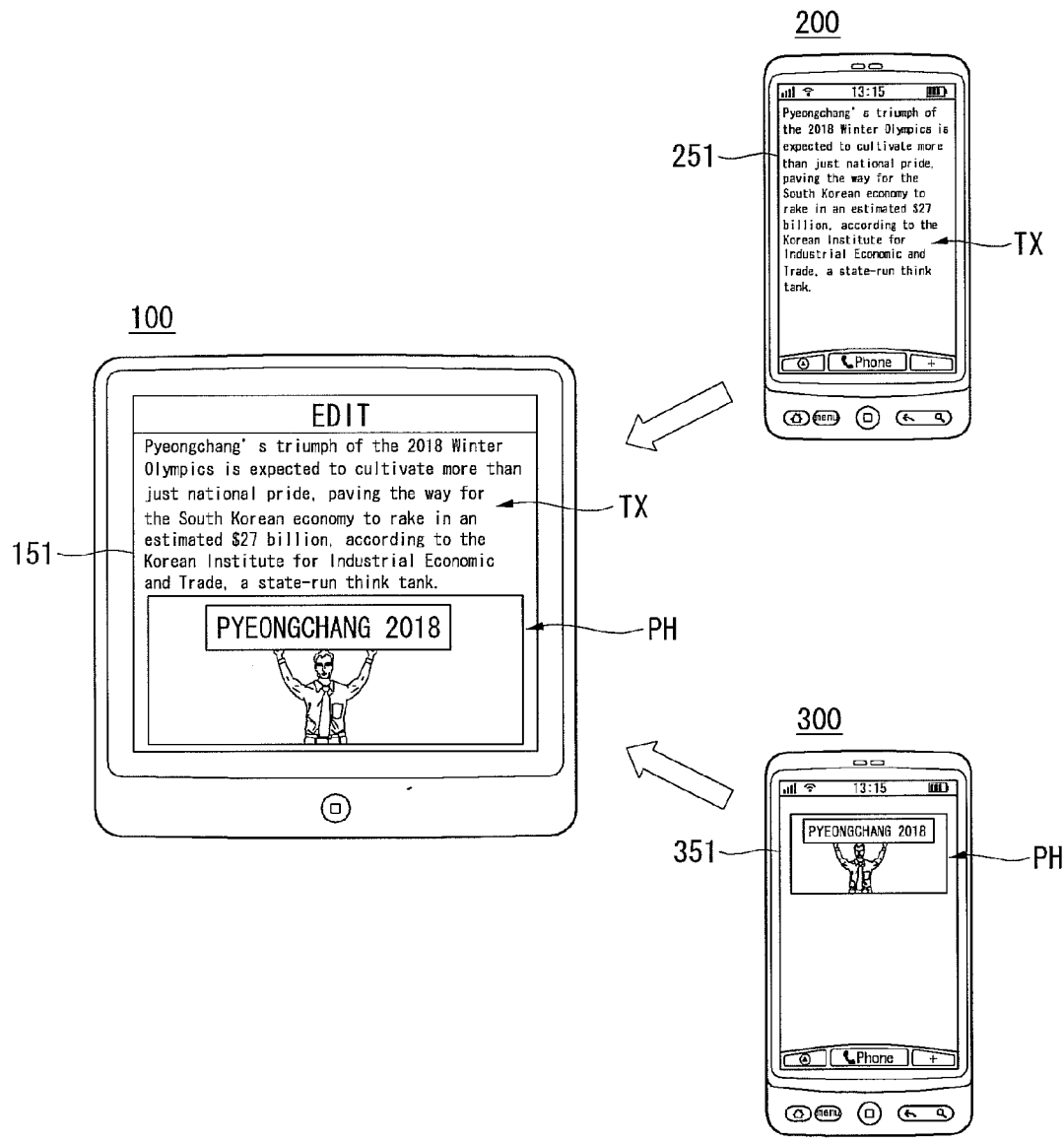
FIG. 29 is a diagram of an example of coupling and displaying data of the mobile terminal.

FIG. 29 is a diagram of an example of coupling and displaying data of the mobile terminal.

As shown in FIG. 29, the mobile terminal 100 may display contents of different forms that are received from a plurality of other terminals 200 and 300.

The first another terminal 200 may include contents of a text TX form.

The second another terminal 300 may include contents of an image PH form.

The mobile terminal 100 may receive and couple a text TX and an image PH, which are contents of different forms from the first and second other terminals 200 and 300.

Figure 30:
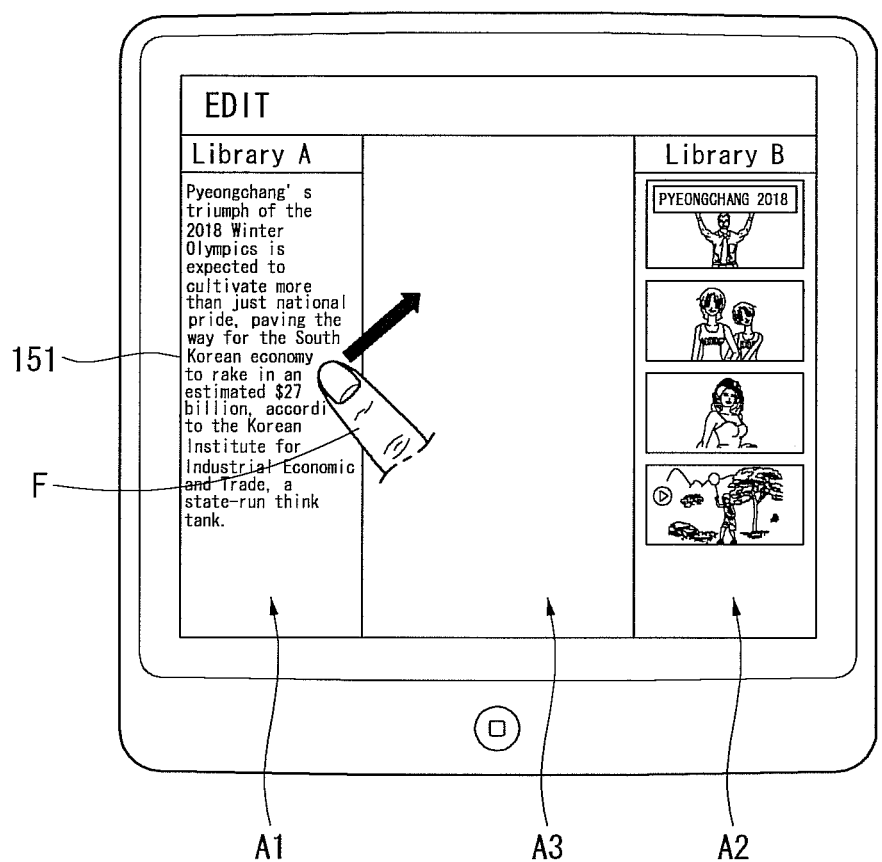
FIGS. 30 to 32 are diagrams of an example of coupling and displaying data of the mobile terminal.
Figure 31:
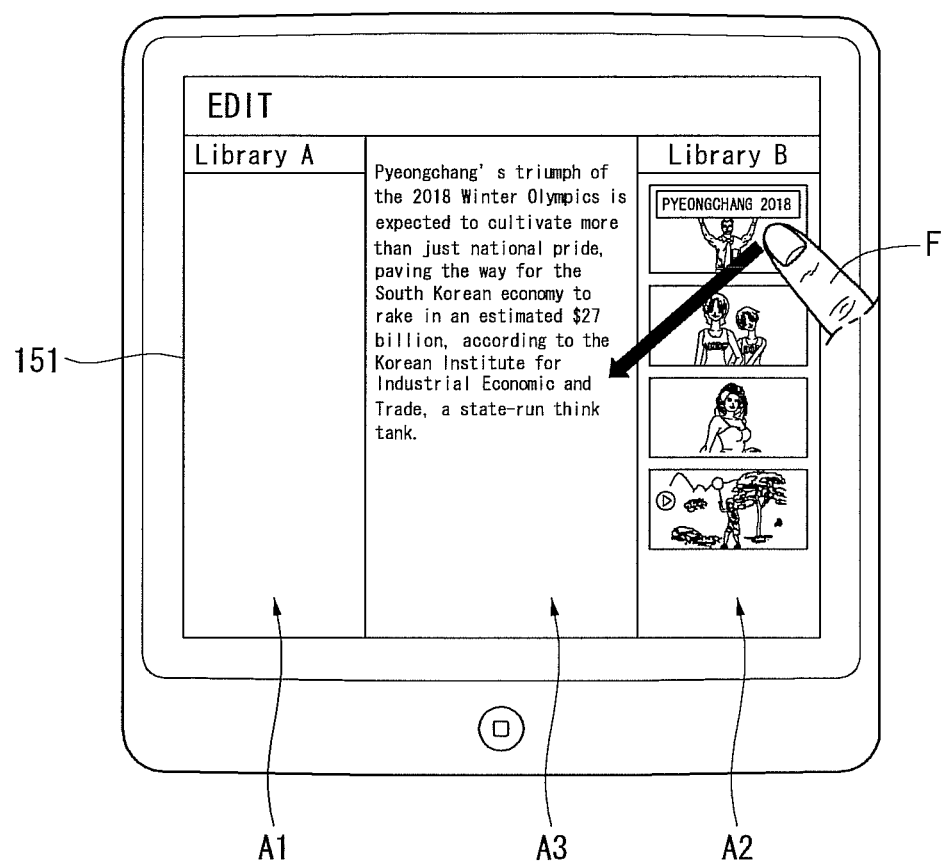
Figure 32:
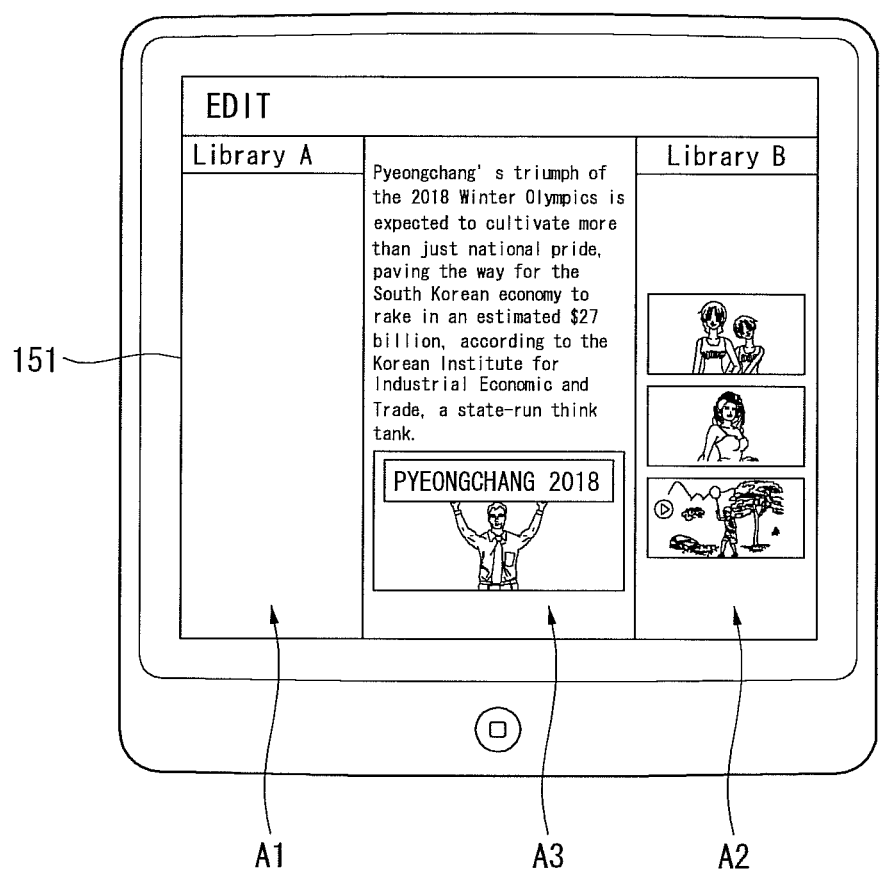

FIGS. 30 to 32 are diagrams of an example of coupling and displaying data of the mobile terminal.

As shown in FIG. 30, the controller 180 may divide and display the display 151 into first to third areas A1 to A3.

The first area A1 may be an area of displaying contents that are received from the first another terminal 200.

The second area A2 may be an area of displaying contents that are received from the second another terminal 300.

The third area A3 may be an area for editing the received contents.

The user may select all or a part of contents of the first and second areas A1 and A2 using a finger F and may move the selected contents to the third area A3. That is, the user may select only specific contents of the received contents and perform an editing action.

A selection of contents may be a drag touch action starting from a specific area. For example, a text may be selected through an action of touching a text of the first area A1 and dragging to the third area A3.

As shown in FIG. 31, a text selected by the user may be displayed in the third area A3.

The user may select image contents to couple to the selected text from the second area A2 and drag the image contents to the third area A3.

As shown in FIG. 32, a text and an image selected by the user may be displayed in the third area A3.

After the display 151 is partitioned into each area and contents are displayed, as contents necessary for an editing area of contents are moved and displayed, an editing action of contents may be more conveniently performed.

Figure 34:
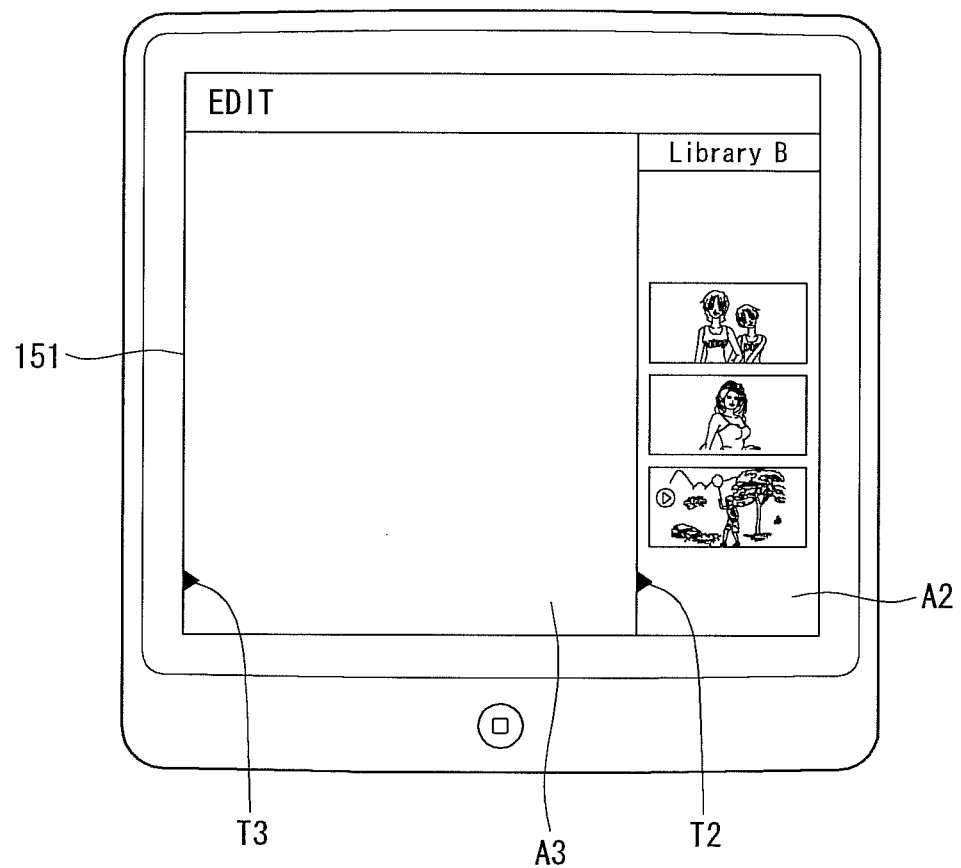

FIGS. 33 and 34 are diagrams of an example of coupling and displaying data of the mobile terminal.

As shown in FIGS. 33 and 34, the mobile terminal 100 may adjust to display or not to display a part of the first to third areas A1 to A3.

As shown in FIG. 33A, first and second tags T1 and T2 may be displayed in a boundary portion of the first to third areas A1 to A3.

When the user selects the first and second tags T1 and T2, the display of the first and/or second areas A1 and A2 may disappear or display based on the selected tag.

As shown in FIG. 33B, the user can select the first tag T1 with a finger F.

As shown in FIG. 34, when the user selects the first tag T1, the display of the first area A1 may disappear. When display of the first area A1 disappears by selecting the first tag T1, a form of the first tag T1 may change to a form of the third tag T3.

When the user selects the third tag T3, a display of the disappeared first area A1 may be displayed again.

FIGS. 35 to 38 are diagrams of a method of coupling data of the mobile terminal.

As shown in FIGS. 35 to 38, the mobile terminal 100 may selectively edit the received data.

Figure 35:
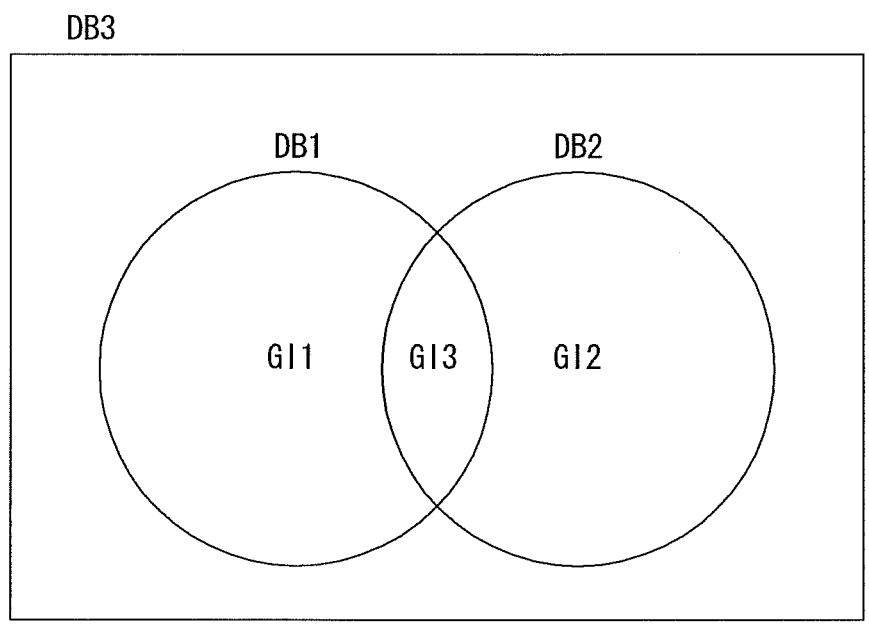

As shown in FIG. 35, first data DB1 and second data DB2 may be received from different electronic devices.

Data belonging to the first data DB1 and the second data DB2 may be divided into first to third groups GI1 to GI3 based on positions thereof.

The first group GI1 may be data belonging to only the first data DB1, and the second group GI2 may be data belonging to only the second data DB2. The third group GI3 may be data commonly belonging to the first and second data DB1 and DB2.

The controller 180 may selectively store data of a group selected from the first to third groups G1 to G3.

Figure 36:

As shown in FIGS. 36, T3 and T6 of fields of the first data DB1 may be selected. T10, T12, T13, and 114 of fields of the second data DB2 may be selected.

The controller 180 may form the third data DB3 with only selected fields. The formed third data DB3 may be stored in the memory 160 of the mobile terminal 100.

As shown in FIG. 37A, first to fifth icons and a first widget corresponding to a specific application may be displayed in the display 151 (of the mobile terminal 100).

As shown in FIG. 37B, first and second icons and a second widget may be displayed in a display 251 (of the another terminal 200).

As shown in FIGS. 37C and 37D, when the mobile terminal 100 and the another terminal 200 exchange data by colliding, information of an icon and/or a widget of a background screen is exchanged.

As shown in FIG. 37C, a list of icons and widgets corresponding to an application that does not exist in the mobile terminal 100 may be displayed in the display 151. As shown in FIG. 37D, a list of icons and widgets corresponding to an application that does not exist in the another terminal 200 may be displayed in the display 251 of the another terminal 200.

A user may select a specific item from a displayed list. The selected specific item may be stored in a corresponding terminal.

As shown in FIG. 38A, the another terminal 200 may include a specific setting value corresponding to a specific function such as Wi-Fi. For example, the another terminal 200 may include a setting value that may approach a specific Wi-Fi service.

As shown in FIG. 38B, the mobile terminal 100 may not include a specific setting of a Wi-Fi.

As shown in FIG. 38C, when the mobile terminal 100 and the another terminal 200 perform an operation of colliding, a setting value of the another terminal 200 may be transmitted to the mobile terminal 100. That is, when the mobile terminal 100 receives a setting value from the another terminal 200, a received setting value may be applied.

FIGS. 39 and 40 are diagrams of an example of coupling and displaying data of the mobile terminal.

As shown in FIGS. 39 and 40, the mobile terminal 100 may use contents received from the another terminal 200 when performing a specific function.

As shown in FIG. 39A, the mobile terminal 100 may perform a specific function, for example, a function of uploading a piece of writing to an SNS. In this example, the another terminal 200 may collide with the mobile terminal 100. The another terminal 200 may be in a state in which a specific image is selected.

As shown in FIG. 39B, an attachment file AF may be added to the display 151. The attachment file AF may be an image file received from the another terminal 200. That is, the received data may be naturally coupled to a presently executing application without a separate manipulation of the user.

As shown in FIG. 40A, the controller 180 may execute an application of writing an E-mail. In a state where a specific image SI of an image gallery is selected, the another terminal 200 may collide with the mobile terminal 100.

As shown in FIG. 40B, the specific image SI received from the another terminal 200 may be automatically attached to an E-mail application that is executing in the mobile terminal 100.

FIG. 41 is a diagram of transmitting data of the mobile terminal.

As shown in FIG. 41, the controller 180 may selectively transmit limited information to the another terminal 200 according to a state of the mobile terminal 100.

As shown in FIG. 41A, the mobile terminal 100 may be in a lock state. That is, before the user performs a specific action or inputs a password, the mobile terminal 100 may be in a state in which execution of a function of the mobile terminal 100 is limited.

When the mobile terminal 100 is in a lock state, the mobile terminal 100 may perform an action of colliding with the another terminal 200. When the mobile terminal 100 collides with the another terminal 200, data of the mobile terminal 100 may be transmitted to the another terminal 200.

As shown in FIG. 41B, a type of data to be transmitted when the mobile terminal 100 is in a lock state may be different from a type of data to be transmitted in a normal state. That is, only limited specific data may be selectively transmitted. For example, only minimum information such as an E-mail address, a phone number, and an SNS address may be selectively transmitted.

Figure 42:
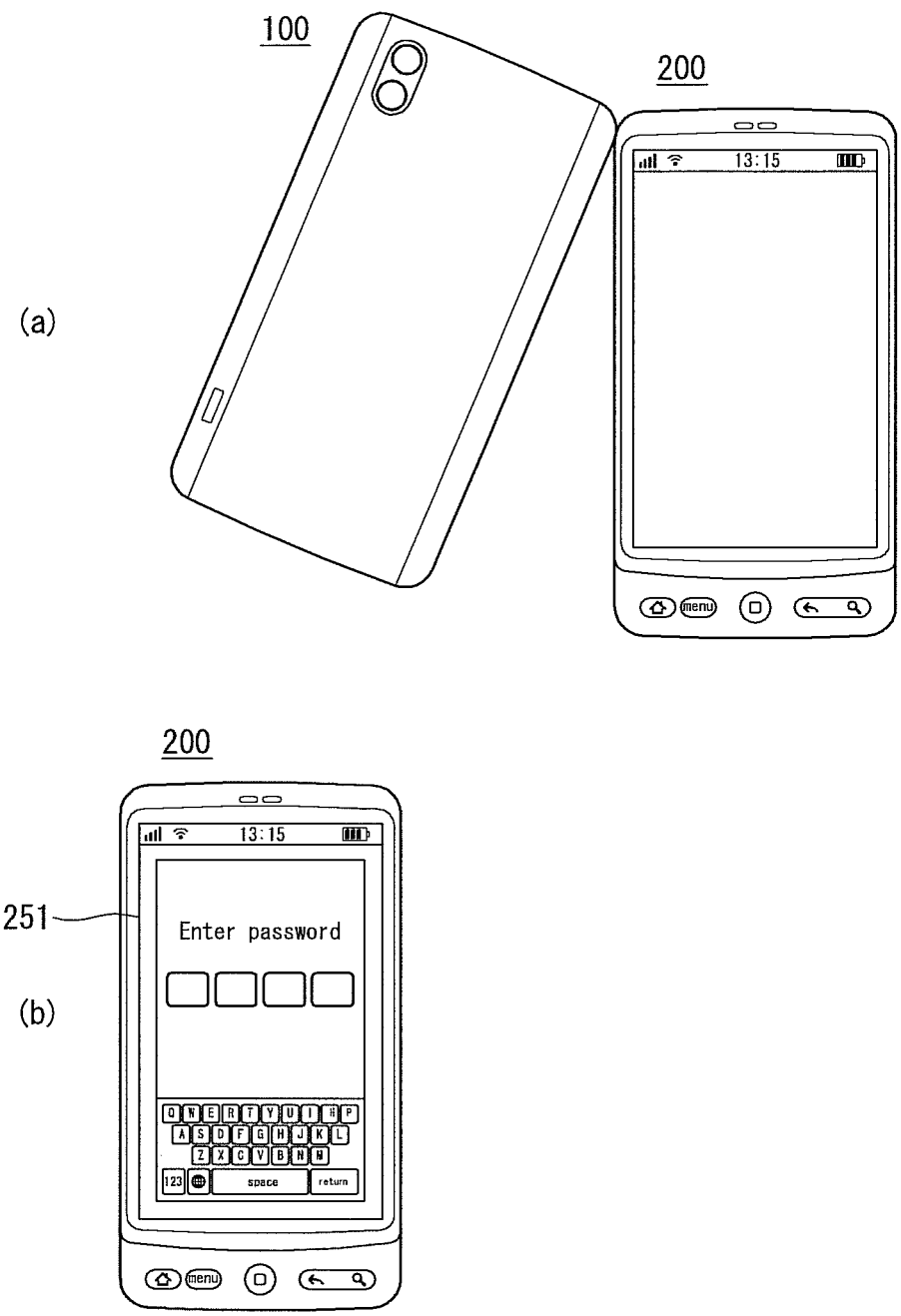

FIGS. 42 and 43 are diagrams of limiting transmitting data of the mobile terminal.

As shown in FIGS. 42 and 43, the controller 180 may transmit data to the another terminal 200 under a predetermined limitation.

As shown in FIG. 42A, the mobile terminal 100 may collide with the terminal 200 in an inverted state.

As shown in FIG. 42B, when the mobile terminal 100 collides with the another terminal 200 in an inverted state, data in which a password is set may be transmitted to the another terminal 200.

As shown in FIG. 42A, when data is transmitted from the mobile terminal 100 to the another terminal 200, data having an expiration time point may be transmitted. For example, when a security card to be used for a banking service is transmitted, the user of the mobile terminal 100 may set and transmit an available period of the security card to the another terminal 200.

As shown in FIG. 42B, the another terminal 200 having received data may notify the user that data having an expiration time point were transmitted.

The above-described method of controlling the mobile terminal may be written as a computer program(s) and may be implemented in digital microprocessors that execute programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or a communication network.

The computer readable recording medium may be any data storage device that may store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal. The method may include displaying a first object on the first touch screen, displaying a second object on the second touch screen, receiving a first touch input applied to the first object, and linking the first object to a function corresponding to the second object when a second touch input applied to the second object is received while the first touch input is maintained.

Embodiments may provide a mobile terminal and a method of controlling the mobile terminal that may easily transmit and receive data in a determined direction based on a result acquired through a sensing unit.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a memory;
   a display;
   a sensing unit configured to sense a motion of the mobile terminal;
   a wireless communication unit configured to wirelessly exchange data with at least one other terminal; and
   a controller configured to receive from the at least one other terminal through the wireless communication unit based on a transmission direction determined according to the motion sensed by using the sensing unit, to compare the received data and stored contents in the memory, to combine the received data and the stored contents in the memory when the received data and the stored contents have at least one common attribute after comparing the received data with the stored contents, and to display the combined contents on the display,
   wherein the controller is configured to:
      display different portions between the received data and the stored contents, the different portions being displayed with different colors or different shapes,
      receive user's selection to one portion from among the different portions, and
      display the selected one portion.

2. The mobile terminal of claim 1, wherein the wireless communication unit includes a near field communication (NFC) module, wherein the controller determines the transmission direction when the at least one other terminal is provided in a communication available area of the NFC communication module.

3. The mobile terminal of claim 1, wherein the controller controls the display to distinguish data stored in the memory from the received data.

4. The mobile terminal of claim 1, wherein the controller changes a display position of the received data based on a touch signal received through the display.

5. The mobile terminal of claim 1, wherein the controller applies the received data to an application that is being executed on the mobile terminal.

6. The mobile terminal of claim 1, wherein the sensed motion of the sensing unit is an impact to the mobile terminal.

7. The mobile terminal of claim 6, wherein the controller determines a transmission direction based on one of a motion, a moving direction, or an impact of the mobile terminal that is sensed by the sensing unit.

8. The mobile terminal of claim 1, wherein the sensing unit is a touch screen, and
   the controller determines the transmission direction based on a drag direction that is provided on the touch screen.

9. The mobile terminal of claim 1, wherein the controller controls the display of data in the display based on a received order of the data.

10. The mobile terminal of claim 1, wherein the controller controls the display to distinguishingly display data stored in the memory from the received data.

11. The mobile terminal of claim 1, wherein the controller changes a display position of the received data based on a touch signal received at the display.

12. The mobile terminal of claim 1, wherein the controller controls the display to partition into a plurality of areas, to display the received data in a first area of the display, and to display selected data from among the received data in a second area of the display.

13. The mobile terminal of claim 1, wherein the controller is configured to display the combined contents which are removed at least one of overlapped portions from among the received data and the stored contents.

14. A method of a mobile terminal, the method comprising:
   detecting a motion of the mobile terminal;
   determining a data transmission direction with respect to another terminal based on the detected motion;
   receiving data from the other terminal or transmitting the data to the at least one other terminal based on the determined data transmission direction;
   comparing the received data and stored contents in a memory;
   combining the received data and the stored contents in the memory when the received data and the stored contents have at least one common attribute after the comparing of the received data with the stored contents; and
   displaying the combined contents on a display,
   wherein the displaying the combined contents includes:
      displaying different portions between the received data and the stored contents, the different portions being displayed with different colors or different shapes,
      receiving user's selection to one portion from among the different portions, and
      displaying the selected one portion.

15. The method of claim 14, wherein detecting the motion comprises detecting one of a motion of the mobile terminal, a moving direction of the mobile terminal, or an impact to the mobile terminal.

16. The method of claim 14, wherein determining the data transmission direction comprises determining the data transmission direction based on one of the detected motion, a moving direction of the mobile terminal, or an impact to the mobile terminal.

17. The method of claim 14, further comprising activating an NFC communication module,
   wherein receiving the data and transmitting the data are performed by the activated NFC communication module.

18. The method of claim 14, further comprising displaying the data based on the received order.

19. The method of claim 14, further comprising distinguishing the display of data stored in memory from the received data.

20. The method of claim 14, further comprising changing a display position of the received data based on a received touch signal.

21. The method of claim 14, wherein the received data is displayed at a first area of the display, and selected data from among the received data is displayed in a second area of the display.

* * * * *